United States Patent
Fujita et al.

(10) Patent No.: US 6,884,546 B1
(45) Date of Patent: *Apr. 26, 2005

(54) SECONDARY BATTERY

(75) Inventors: Shigeru Fujita, Kanagawa (JP);
Hiroyuki Akashi, Kanagawa (JP);
Momoe Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 09/856,431

(22) PCT Filed: Sep. 11, 2000

(86) PCT No.: PCT/JP00/06181
§ 371 (c)(1),
(2), (4) Date: Jul. 12, 2001

(87) PCT Pub. No.: WO01/22519
PCT Pub. Date: Mar. 29, 2001

(30) Foreign Application Priority Data

Sep. 20, 1999 (JP) .......................... 11-266017

(51) Int. Cl.[7] .................. H01M 4/02; H01M 4/58; H01M 10/40
(52) U.S. Cl. ............. 429/231.9; 429/60; 429/231.4; 429/231.8; 429/231.95; 429/331; 429/332
(58) Field of Search ............... 429/231.8, 231.95, 429/330, 331, 332, 341, 199, 60, 66, 231.9, 231.4

(56) References Cited

U.S. PATENT DOCUMENTS 5,626,981 A * 5/1997 Simon et al. ............... 429/105
5,709,968 A * 1/1998 Shimizu .................... 429/324
6,025,094 A * 2/2000 Visco et al. ............. 429/231.95
2002/0076605 A1 * 6/2002 Akashi et al. .............. 429/60
2003/0008212 A1 * 1/2003 Akashi et al. .......... 429/231.9

FOREIGN PATENT DOCUMENTS

| JP | 04162370 | 6/1992 |
|----|----------|--------|
| JP | 04328278 | 11/1992 |
| JP | 07326342 | 12/1995 |
| JP | 08298117 | 11/1996 |
| JP | 10003948 | 1/1998 |
| JP | 11-31534 | * 2/1999 |
| JP | 11-031534 | * 2/1999 |
| JP | 11031534 | 2/1999 |
| JP | 11238515 | 8/1999 |

* cited by examiner

Primary Examiner—Jonathan Crepeau
(74) Attorney, Agent, or Firm—Sonnenschein, Nath & Rosenthal LLP

(57) ABSTRACT

Provided is a secondary battery in which high energy density can be obtained and charging/discharging cycle characteristic can be improved. A positive electrode (13) and a negative electrode (15) are stacked with a separator (16) interposed therebetween, and are enclosed inside an exterior can (11) to which an electrolyte is injected. The negative electrode (15) contains a negative electrode material capable of occluding/releasing lithium in an ionic state. Thereby, lithium metal precipitates in the negative electrode (15) in a state where the open circuit voltage is lower than the overcharge voltage. In other words, lithium is occluded in an ionic state in a negative electrode material capable of occluding/releasing lithium in the beginning of charging, and then lithium metal precipitates on the surface of the negative electrode material thereafter during charging. The amount of precipitation of lithium metal is preferable to be from 0.05 to 3.0 times, both inclusive, the ability of charging capacity of the negative electrode material capable of occluding/releasing lithium. Thereby, a high energy density and an excellent cycle characteristic can be obtained.

22 Claims, 6 Drawing Sheets chemical shift(reference substance:LiCl)(ppm)

chemical shift(reference substance:LiCl)(ppm)

chemical shift(reference substance:LiCl)(ppm)

chemical shift(reference substance:LiCl)(ppm)

SECONDARY BATTERY

TECHNICAL FIELD

The invention relates to a secondary battery comprising a negative electrode, a positive electrode and an electrolyte, specifically, to a secondary battery in which light metal is used for an electrode reaction.

BACKGROUND ART

Recently, in accordance with development in electronic technology, a number of portable electron devices such as VTRs (video tape recorder) with a built-in camera, cellular phones and laptop computers have come into wide use, and miniaturization and weight-reduction of the devices have become the subject. Research and developing aimed at improving energy density of batteries used for portable power sources for the devices, specially secondary batteries, have been actively conducted.

Widely known secondary batteries of the related art are a lead battery, a Ni(nickel)-Cd(cadmium) battery, a lithium ion secondary battery in which a material such as a carbonaceous material capable of occluding/releasing lithium (Li) is used for a negative electrode, and a lithium secondary battery in which lithium metal is used for a negative electrode. A large expectation has been put on a secondary battery using a non-aqueous electrolyte, specifically on a lithium ion secondary battery, since the battery can obtain a higher energy density than the lead battery and the nickel-cadmium battery of the related art using an aqueous electrolyte, and its market has largely grown. Also, theoretical electrochemical equivalent of lithium metal in the lithium secondary battery is as large as 2054 mAh/dm$^3$, which is equivalent to 2.5 times the graphite material used in a lithium ion secondary battery. Thereby, an excellent energy density higher than that of the lithium ion secondary battery can be expected and the lithium secondary battery has been actively studied.

However, while being capable of obtaining a large capacity, a lithium secondary battery has low charging/discharging efficiency. Also, it has a problem such as deterioration in the charging/discharging capacity when repeating charging and discharging, thereby having an insufficient charging/discharging cycle characteristic. Especially, the problem is noticeable when performing boosting charge by a large current for a short time. Therefore, it is difficult to perform boosting charge on the lithium secondary battery. Also, in the lithium secondary battery, lithium is consumed by repeating charging and discharging. Therefore, it is necessary for the lithium secondary battery to contain an excessive amount of lithium in advance. As a result, there is another problem such that the actual charging/discharging capacity cannot be made much larger.

The problems are directly due to the fact that lithium metal forming a negative electrode is pulverized during a dissolving/re-crystallizing process of lithium metal at the time of charging/discharging. As techniques for suppressing the pulverization, a variety of improvement methods are proposed as noted in "Lithium Batteries" (Edited by JEAN-PAUL GABANO, ACADEMIC PRESS, 1983, London, New York). For example, a lithium alloy such as a lithium-aluminum alloy is used as a negative electrode material, a variety of additives are added to an electrolyte, or the surface of the lithium metal is slightly coated by a carbonaceous material. However, none of these methods are sufficient and it has been still difficult to put a lithium secondary battery in a practical use.

One of the reasons for having difficulties suppressing pulverization of lithium metal is that the volume of the negative electrode made of lithium metal largely changes at the time of charging/discharging. For example, as may be evident in the characteristic of manganese-lithium secondary batteries on the market, the amount of displacement is small in the distance between the positive electrode and negative electrode when charging/discharging is shallow, and the electrode reaction on the surface of the negative electrode tends to proceed homogeneously. On the contrary, when charging/discharging is deep, the amount of displacement is large in the distance between the positive electrode and negative electrode and the displacement phenomenon tends to proceed heterogeneously. Therefore, the distance between the positive electrode and negative electrode tends to be heterogeneous. These can be considered as the reasons for promoting pulverization of lithium metal at the time of charging/discharging.

According to the hypothesis, it is assumed that pulverization of the lithium metal can be suppressed by minimizing the displacement in the distance between the positive electrode and negative electrode as small as possible so that the charging/discharging cycle characteristic can be improved.

For example, one of the methods for minimizing the amount of displacement in the distance between the positive electrode and negative electrode is minimizing the amount of reaction of the negative electrode made of lithium metal. However, if this method is applied to a lithium secondary battery of the related art in which lithium metal is provided on a collector layer, the energy density of the battery is largely deteriorated. As a result, the significance of using lithium metal for a negative electrode, which initially has high electrochemical equivalent, becomes insignificant.

Another method for minimizing the amount of displacement in the distance between the positive electrode and negative electrode is to maintain the distance between the positive electrode and negative electrode constant by applying a pressure through providing a spring or the like. However, if a spring or the like with no electrode activity is provided inside the battery, the fraction of the volume of the electrode active material inside the battery becomes relatively low for the volume of the spring or the like provided. Thereby, the discharging density and the energy density of the battery deteriorates.

Therefore, development of a secondary battery in which the amount of displacement in the distance between the positive electrode and negative electrode can be minimized without deteriorating the characteristic capable of obtaining a high energy density has been demanded. In developing such a secondary battery, it is necessary to study the composition of an electrolyte in order to sufficiently utilize the capacity of the electrode in addition to studying the electrode material.

The invention has been designed to overcome the foregoing problems. The object of the invention is to provide a secondary battery in which a high energy density can be obtained and the charging/discharging cycle characteristic can be improved.

DISCLOSURE OF THE INVENTION

A secondary battery of the invention comprises a negative electrode, a positive electrode and an electrolyte wherein: the negative electrode contains a negative electrode material capable of occluding and releasing light metal in an ionic state while the light metal precipitates in the negative electrode in a state where the open circuit voltage is lower than the overcharge voltage.

A secondary battery of the invention comprises a negative electrode, a positive electrode and an electrolyte, wherein: the capacity of the negative electrode is expressed by the sum of the capacity which is obtained when occluding/releasing light metal in an ionic state and the capacity which is obtained when precipitating/dissolving light metal.

In a secondary battery of the invention, charging is performed by the shift of light metal ions from the positive electrode to the negative electrode via an electrolyte, and discharging is performed by the shift of light metal ions from the negative electrode to the positive electrode via an electrolyte. In the process of charging at this time, the light metal precipitates in the negative electrode when the open circuit voltage is lower than the overcharge voltage.

In another secondary battery of the invention, charging is performed by the shift of light metal ions from the positive electrode to the negative electrode via an electrolyte, and discharging is performed by the shift of light metal ions from the negative electrode to the positive electrode via an electrolyte. At this time, the capacity of the negative electrode is expressed by the sum of the capacity which is obtained when occluding/releasing light metal in an ionic state and the capacity which is obtained when precipitating/dissolving light metal.

Other and further objects, features and advantages of the invention will appear more fully from the following description.

BEST MODE FOR CARRYING OUT THE INVENTION

Figure 1:
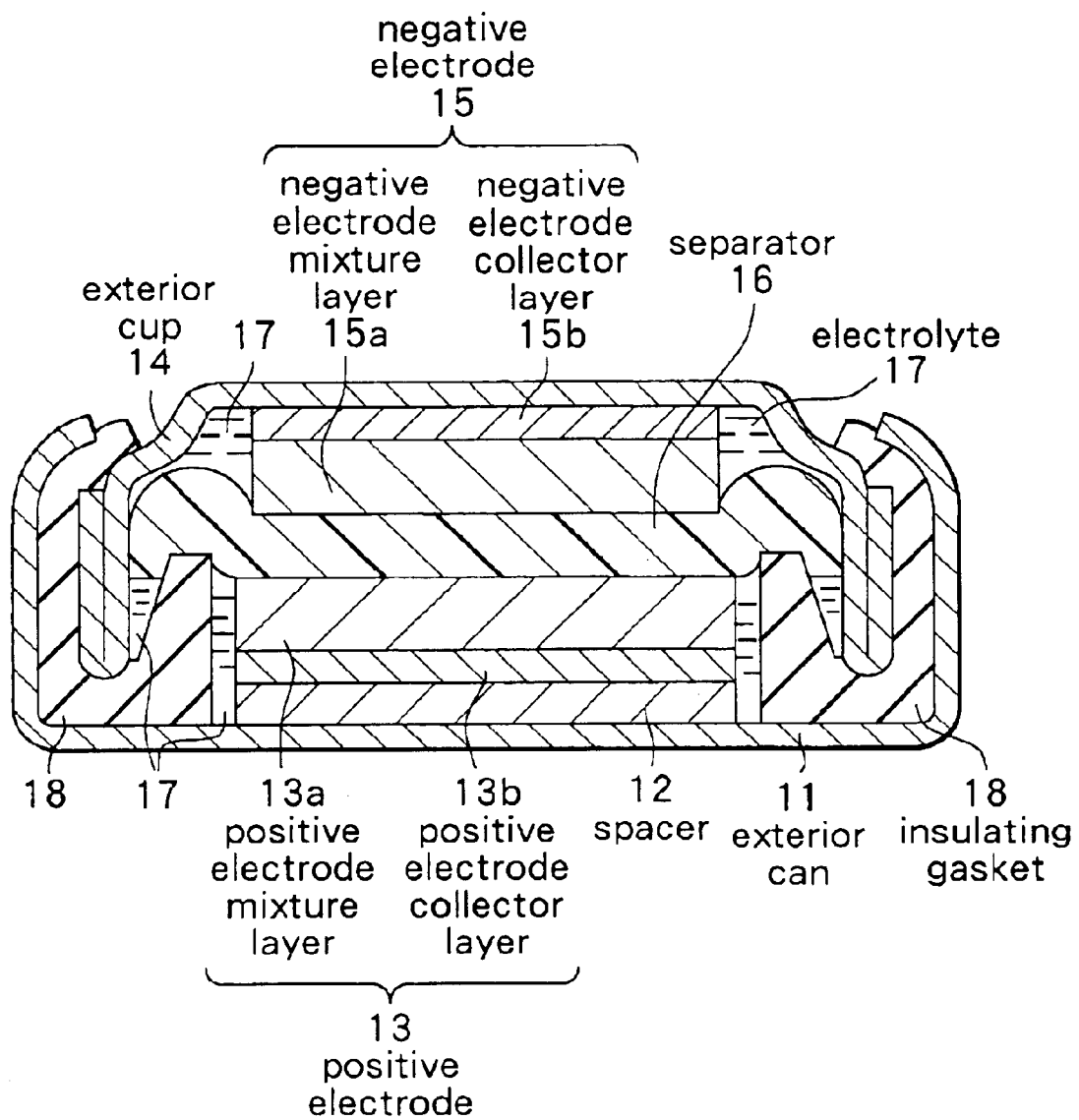
FIG. 1 is a cross section showing the configuration of a secondary battery according to a first embodiment of the invention.

In the following, embodiments of the invention will be described in detail by referring to the drawings.

[First Embodiment]

FIG. 1 shows the cross sectional configuration of a secondary battery according to a first embodiment of the invention. The secondary battery shown in FIG. 1 is what we call a coin-type. The secondary battery is formed by stacking a circular-plate positive electrode 13 enclosed in an exterior can 11 via a spacer 12 and a circular-plate negative electrode 15 enclosed in an exterior cup 14 with a separator 16 interposed therebetween. Inside the exterior can 11 and the exterior cup 14 are filled with an electrolyte which is an aqueous electrolyte, and peripheral edges of the exterior can 11 and the exterior cup 14 are sealed by caulking with an insulating gasket 18 in between.

The exterior can 11 and the exterior cup 14 are formed of, for example, iron (Fe) whose surface is plated with nickel (Ni), respectively.

The spacer 12 is provided for adjusting the thickness of the battery and is made of, for example, copper (Cu).

The positive electrode 13 comprises, for example, a positive electrode mixture layer 13a, and a positive electrode collector layer 13b provided on the exterior cup 14 side of the positive electrode mixture layer 13a. The positive 13b is formed of a metallic foil such as aluminum (Al) foil. The positive electrode mixture layer 13a is formed containing, for example, a positive electrode active material, a conductive agent such as graphite, and a binder such as polyvinylidene fluoride.

As the positive electrode active material, a compound containing lithium as the light metal, such as lithium oxide or lithium sulfide, and an intercalation compound containing lithium are appropriate. Two and more kinds of these may be mixed to be used. Especially, it is preferable for the positive electrode active material to contain a lithium composite oxide which mainly includes $Li_xMO_2$ in order to obtain a higher energy density. M is preferable to be one and more kind of transition metals. Specifically, it is preferable to be at least one kind selected from the group consisting of cobalt (Co), nickel (Ni), manganese (Mn), iron (Fe), aluminum (Al), vanadium (V), and titanium (Ti). x varies depending on the charging/discharging state of the battery and is normally in the range of $0.05 \leq x \leq 1.10$. Specific examples of such lithium composite oxides are $Li_xCoO_2$, $Li_xNi_2$, $Li_xNi_yCo_{1-y}O_2$ and $Li_xMn_2O_4$ (where, x≈0.1, 0<y<1).

The lithium composite oxide is prepared in the following manner. For example, carbonate, nitrate, oxide, or hydroxide of lithium and carbonate, nitrate, oxide, or hydroxide of transition metal are mixed in a desired composition and pulverized, and then calcined in an oxidizing atmosphere at a temperature within the range of 600 to 1000° C., both inclusive.

It is preferable that the positive electrode mixture layer 13a contains, in regard to improving the charging/discharging capacity, the amount of lithium corresponding to 280 mAh and more of charging/discharging capacity per 1 g of the negative electrode active material in a steady state (e.g., after repeating charging/discharging about 5 times). It is more preferable to contain the amount of lithium corresponding to 350 mAh and more of charging/discharging capacity. However, all of the lithium does not have to be supplied from the positive electrode mixture layer 13a, that is, the positive electrode 13, but may be present throughout the battery. For example, lithium inside the battery can be supplemented by laminating lithium metal or the like on the negative electrode 15. The amount of lithium inside the battery can be quantitated by measuring the discharging capacity of the battery.

The positive electrode mixture layer 13a may further contain, for example, metallic carbonate such as lithium carbonate ($Li_2O_3$). It is preferable to contain metallic carbonate as described since it can further improve the cycle characteristic. This is considered to be due to the fact that part of metallic carbonate in the positive electrode 13 is dissolved and forms a stable coating on the negative electrode 15.

The negative electrode 15 comprises, for example, a negative electrode mixture layer 15a and a negative electrode collector layer 15b provided on the exterior can 11 side of the positive electrode mixture layer 15a. The negative electrode mixture layer 15a is formed containing a negative electrode material capable of occluding/releasing lithium, comprising light metal, in an ionic state as a negative electrode active material. The Occlusion of the light metal in an ionic state denotes a state where light metal exists taking the form of ion and a typical example thereof is the electrochemical intercalation of light metal in an ionic state to graphite. It is a concept different from precipitation of light metal in a metallic state. In the following, there may be a case where it is simply referred to as occlusion of the light metal in order to simplify the description. Examples of the negative electrode materials are a carbonaceous material, a metallic compound, silicon, a silicon compound, and a polymer material. One of these, or two and more kinds may be mixed to be used.

Examples of the carbonaceous materials are non-graphitizing carbon, graphitizing carbon, graphite, cracked carbon, cokes, glassy carbon, polymer organic compound calcined materials, carbon fiber and activated carbon. The cokes include pitch coke, needle coke and petroleum coke. The polymer compound calcined material is a material obtained by calcining a polymer material such as phenolic resin or furan resin to be carbonated at an appropriate temperature and some of which are classified into a non-graphitizing carbon or a graphitizing carbon. Examples of the metallic compounds are oxides such as $SnSiO_3$ and $SnO_2$ and examples of polymer materials are polyacetylene and polypyrrole.

As the negative electrode material, the ones having a charging/discharging potential relatively close to that of lithium metal is preferable. The reason is that the lower the charging/discharging potential of the negative electrode 15 is, the easier the high energy density of the battery can be obtained. Especially, the carbonaceous material is preferable since changes in the crystal structure which occur at the time of charging/discharging are very small so that a high energy density and an excellent cycle characteristic can be obtained. Specifically, graphite is preferable since the electrochemical is high so that a high energy density can be obtained. Also, non-graphitizing carbon is preferable so that an excellent cycle characteristic can be obtained.

Graphite with a true density of, for example, $2.10/cm^3$ and more is preferable and the one with $2.18/cm^3$ is more preferable. In order to obtain such a true density, it is necessary that the thickness of C-axis crystal of 002 plane is 14.0 nm and more. It is preferable that the interlayer spacing distance (002) plane is less than 0.340 nm and is more preferable to be within the range of 0.335 nm to 0.337 nm, both inclusive.

The graphite may be natural graphite or artificial graphite. Artificial graphite can be obtained by carbonating an organic substance, apply ing a heat treatment at a high temperature, and then pulverizing/classifying it. The heat treatment at a high temperature is performed by, for example, carbonating the material at 300° C. to 700° C. in an inert gas flow such as nitrogen ($N_2$) if necessary, increasing the temperature to 900° C. to 1500° C. at a rate of 1° C. to 100° C. per minute and then calcining it by keeping the temperature for about 0 to 30 hours, and heating it to 2000° C. and more, more preferably to 2500° C. and more, and keeping the temperature for an appropriate length of time.

Coal or pitch can be used as an organic substance as the starting material. Examples of the pitches are coal tar, tar obtained by cracking ethylene bottom oil or crude oil at a high temperature, and tar obtained from asphalt or the like by performing distillation (vacuum distillation, atmospheric distillation, steam distillation), thermal polycondensation, extraction, chemical polycondensation and the like, pitch generated at the time of dry distillation of wood, polyvinyl chloride resin, polyvinyl acetate, polyvinyl butylate and 3, 5-dimethyl-phenol resin. During carbonization, coal and pitch exist in a liquid state at a temperature of about 400° C. at the maximum and the aromatic rings become a state of laminated orientation by being condensed and polycycled through maintaining the temperature. At about 500° C. and more, semicokes, which is a precursor of solid carbon can be formed (a liquid phase carbonization process).

Examples of the organic substances are condensed polycyclic hydrocarbon compounds such as naphthalene, phenanthrene, anthracene, triphenylen, pyrene, perylene, pentaphen and pentacen, the derivatives thereof (e.g., their carboxylic acid, carboxylic anhydride, carboxylic imide), and the mixture thereof. Other examples are condensed heterocycle compounds such as acenaphtylene, indole, isoindole, quinoline, isoquinoline, quinoxaline, phthalazine, carbazole, acridine, phenazine and phenantolidine, and the derivatives and mixtures thereof.

Pulverization may be performed at any time during the process of increasing the temperature before/after carbonization and calcinations or before graphitization. In this case, lastly a heat treatment for graphitization is performed in a state of powder. However, in order to obtain graphite powder with high bulk density and fracture strength, it is preferable to apply a heat treatment after molding a starting material and pulverizing/classifying the obtained graphitized molded body.

For example, when forming the graphitized molded body, after cokes to be a filler and a binder pitch to be a molding agent or a sintering agent are mixed and molded, a calcining step of applying a heat treatment on the molded body at a low temperature of 1000° C. and below and a pitch-impregnating step of impregnating a binder pitch which is dissolved in the calcined body are repeated a number of times. Then, a heat treatment at a high temperature is applied. The impregnated binder pitch is carbonated and graphitized in the above-mentioned process of heat treatment. In this case, the filler (cokes) and the binder pith are used as the starting material thereby being graphitized as a polycrystal body. Also, sulfur and nitrogen contained in the starting material generates gas at the time of the heat treatment, thereby forming micropores on the way through. Because of the pores, occluding/releasing of lithium becomes easier and processing efficiency becomes higher industrially. As the starting material for the molded body, a filler having a moldability and sintering characteristic by itself may be used. In this case, it is unnecessary to use a binder pitch.

The non-graphitizing carbon is preferable to have an interlayer spacing distance (002) plane of 0.32 nm and more and a true density of less than $1.70 \text{ g/cm}^3$, and not to exhibit an exothermic peak at 700° C. and more in the differential thermal analysis (DTA) in the air.

The non-graphitizing carbon can be obtained by performing a heat treatment on an organic substance at about 1200° C. and then pulverizing/classifying it. The heat treatment is performed by, for example, carbonating the material at 300°

C. to 700° C. (solid phase carbonating process) if necessary, increasing the temperature to a temperature from 900° C. to 1300° C. at a rate of 1 to 100° C. per minute and then calcining it by keeping the temperature for about 0 to 30 hours. Pulverization may be performed before/after carbonization, or during the process of increasing a temperature.

Examples of the organic substances as the starting material are polymer and copolymer of furfuryl alcohol and furfural, or a furan resin which is a copolymer of the polymer and other resin. Other Examples are a phenol resin, an acryl resin, a vinyl halide resin, a polyimide resin, a polyamide-imide resin, a polyamide resin, a conjugate resin such as polyacetylene or polyparaphenylene, cellulose and cellulosic, coffee beans, bamboos, crustacea including chitosan, and bio-cellulose using bacteria. Still other examples are a compound obtained by bonding a functional group including oxygen (O) (so-called a oxygen cross-linking) to a petroleum pitch in which the fraction of the number of atoms of hydrogen (H) and carbon (C), H/C, is, for example, 0.6 to 0.8.

Preferably, the compound contains 3% and more oxygen, more preferably 5% and more (see Japanese Patent Application laid-open Hei 3-252053). This is due to the fact that the oxygen content influences the crystal structure of the carbonaceous material, and the property of the non-graphitizing carbon and the capacity of the negative electrode can be improved by containing the above-mentioned content and more of oxygen. The petroleum pitch can be obtained, for example, by performing distillation (vacuum distillation, constant pressure distillation, steam distillation), thermal polycondensation, extraction and chemical polycondensation on tar, asphalt and the like, the tar being obtained by cracking coal tar, ethylene bottom oil or crude oil at a high temperature. Examples of methods for forming oxidation cross-linking are a wet method in which aqueous solutions of nitric acid, sulfuric acid, hypochlorous acid or a mixed acid of these, and the petroleum pitch are activated, a dry method in which an oxidizing gas such as air or oxygen and the petroleum pitch are activated, and a method in which a solid reagent such as sulfur, ammonium nitrate, ammonium persulfate, or ferric chloride, and the petroleum pitch are activated.

The organic substances as the starting material are not limited to these but any other organic substances, which can be non-graphitizing carbonaceous material through a solid phase carbonization process by oxidation cross-linking process, may be applied.

In addition to the non-graphitizing carbonaceous material prepared using the above-mentioned organic substance as the starting material, it is also preferable to use a compound, disclosed in Japanese Patent Application laid-open Hei 3-137010, which mainly contains phosphorus (P), oxygen and carbon since it exhibits the property parameter mentioned above.

Incidentally, in the embodiment, the negative electrode material capable of occluding/releasing lithium does not include lithium metal and lithium alloy such as lithium-aluminum alloy, which function as a negative electrode active material when lithium is precipitated/dissolved. However, the secondary battery may contain lithium metal or lithium alloy in the negative electrode mixture layer 15a as the negative electrode active material. Also, however not shown in the figure, a metallic layer made of lithium metal or lithium alloy may be included in the negative electrode 15 separately from the negative electrode mixture layer 15a.

The negative electrode mixture layer 15a may be formed containing a binder such as polyvinylidene fluoride (PVDF), for example. The negative electrode collector layer 15b is formed of a metallic foil such as a copper (Cu) foil.

In the secondary battery, in the process of charging, lithium metal starts to precipitate in the negative electrode 15 when the open circuit voltage (that is, the battery voltage) is lower than the overcharge voltage. In other words, in the secondary battery, lithium metal precipitates in the negative electrode 15 in a state where the open circuit voltage is lower than the overcharge voltage, and the capacity of the negative electrode 15 is expressed by the sum of the capacity which is obtained when occluding/releasing lithium in an ionic state and the capacity which is obtained when precipitating/dissolving lithium metal.

The overcharge voltage herein means an open circuit voltage when the battery is overcharged, and indicates the voltage higher than the open circuit voltage of the "full-charged" battery, which is defined in page 6 of "GUIDE LINE FOR SAFETY EVALUATION ON SECONDARY LITHIUM CELLS" (SBA G1101) which is one of the guide lines appointed by JAPAN STORAGE BATTERY ASSOCIATION (BATTERY ASSOCIATION OF JAPAN), for example. In other words, it means that the voltage higher than the open circuit voltage charged by a charging method used when obtaining the nominal capacity of each battery, a standard charging method, or a recommended charging method. Specifically, the secondary battery is full-charged when, for example, the open circuit voltage is 4.2 V and lithium metal precipitates on the surface of the negative electrode material capable of occluding/releasing lithium in one part within the range of the open circuit voltage from 0 V to 4.2 V, both inclusive.

Therefore, a peak attributed to lithium ion and a peak attributed to lithium metal can be obtained when measuring the negative electrode 15 (specifically, a negative electrode material capable of occluding/releasing lithium) in a full-charged state by a $^7$Li polynuclear species nuclear magnetic resonance spectroscopy. On the other hand, the peak attributed to lithium ion disappears when measuring the negative electrode material in a complete-discharged state by the $^7$Li polynuclear species nuclear magnetic resonance spectroscopy. The complete-discharged state corresponds to the case where there is no supply of the electrode reactant (lithium in the embodiment) from the negative electrode 15 to the positive electrode 13. For example, the secondary battery and the lithium-ion secondary battery according to the embodiment can be considered as being "completely discharged" when the open circuit voltage reaches 2.75 V.

Thereby, in the secondary battery, a high energy density can be obtained while the cycle characteristic and the boosting charging characteristic can be improved. With respect to precipitation of lithium metal in the negative electrode 15, it is the same as the lithium secondary battery of the related art using lithium metal or lithium alloy for the negative electrode. It may be due to the fact the following advantages obtained by precipitation of lithium metal in the negative electrode capable of occluding/releasing lithium.

First, with the lithium secondary battery of the related art, it is difficult to heterogeneously precipitate lithium metal, resulting in deterioration in the cycle characteristic. In the secondary battery of the invention, however, lithium metal can heterogeneously precipitate since the negative electrode capable of occluding/releasing lithium generally has a large surface area. Secondly, with the secondary battery of the related art, changes in volume by precipitating/dissolving of lithium metal are large, resulting in deterioration in the cycle characteristic. In the secondary battery of the invention, however, lithium metal precipitates in spaces between particles of the negative electrode material capable of occluding/releasing lithium so that changes in volume are small. Thirdly, with the secondary battery of the related art, the above-mentioned problems become larger, as the amount of precipitating/dissolving lithium metal becomes larger. With the secondary battery of the invention, however, the amount of precipitating/dissolving lithium metal is small for a battery with such a large capacity since occlusion/release of lithium by the negative electrode capable of occluding/ releasing lithium contributes to the charging/discharging capacity. Fourthly, with the secondary battery of the related art lithium metal precipitates more heterogeneously when performing boosting charging, resulting in further deterioration in cycle characteristic. With the secondary battery of the invention, however, boosting charging can be performed since lithium is occluded in the negative electrode material capable of occluding/releasing lithium in the beginning of charging.

In order to more effectively obtain the advantages, it is preferable that the maximum amount of lithium precipitating in the negative electrode at the maximum voltage of the open circuit voltage before reaching overcharge voltage is from 0.05 to 3.0 times, both inclusive, the charging capacity of the negative electrode material capable of occluding/releasing lithium. The reason is that the same problems as those of the related art occur if the amount of precipitation of lithium is too large and a sufficient charging/discharging capacity cannot be obtained if the amount is too small. Also, for example, the discharging capacity of the negative electrode material capable of occluding/releasing lithium is preferable to be 150 mAh/g and more. The reason is that the larger the ability of occluding/releasing lithium is, the smaller the amount of precipitation of lithium becomes. The charging capacity of the negative electrode material can be obtained from the amount of electricity when charging the negative electrode, with the negative electrode material as the negative electrode active material, to 0 V by a constant current/ constant voltage method with, for example, lithium metal being the opposite electrode. The discharging capacity of the negative electrode material can be obtained from the amount of the electricity when keeping discharging it to 2.5 V by a constant current method for 10 hours and more.

Furthermore, for example, the thickness of the negative electrode mixture layer 15a containing the negative electrode material capable of occluding/releasing lithium in the opposite direction to the positive electrode 13 is preferable to be from 10 $\mu$m to 300 $\mu$m, both inclusive. The reason is that the amount of lithium precipitating in the negative electrode material becomes heterogeneous in the thickness direction if the negative electrode mixture layer 15a is too thick, resulting in deterioration in cycle characteristic. The amount of precipitating lithium becomes relatively too large if the thickness is too thin so that the same problems as those of the secondary battery of the related art occur. In addition, for example, in the case where the negative electrode 15 contains a material as the negative electrode active material other than the negative electrode material capable of occluding/releasing lithium such as lithium metal or lithium alloy, it is preferable to contain 50 percent by volume and more of the negative electrode material capable of occluding/releasing lithium. The reason is that the problems of the lithium secondary battery of the related art cannot be sufficiently solved if the proportion of the negative electrode material capable of occluding/releasing lithium contained is small.

The separator 16 let lithium ions pass through while separating the positive electrode 13 and the negative electrode 15 and suppressing short circuit of the current, which occurs due to the contact of both electrodes.

The separator 16 is formed of a porous film made of synthetic resin such as polytetorafluoroethylene, polypropylrne, or polyethylene, or a ceramic porous film. Also, it may have a configuration in which two and more kinds of porous films are laminated. Especially, a porous film made of polyolefin is preferable since it is excellent in suppressing short circuit and can improve safety of the battery by the shutdown effect. Specifically, polyethylene is preferable as the material for forming the separator 16 since it can obtain the shutdown effect at a temperature within the range of 100° C. to 160° C., both inclusive, and is also excellent in electrochemical stability. Polypropylene is also preferable. Other resins having chemical stability can be used by being co-polymerized or blended with polyethylene or polypropylene.

The porous film made of polyolefin can be obtained in the following manner. For example, a fused low-volatile solvent in a state of liquid is mixed with a fused polyolefin composite, thereby obtaining a solvent with high concentration of homogeneous polyolefin composite. The solvent is molded with a die and cooled down to obtain a gel sheet, and then stretched.

Examples of the low-volatile solvent are low-volatile aliphatic or cyclic hydrocarbon such as nonane, decane, decaline, p-xylene, undecane, and liquid paraffin. The proportion of mixing the polyolefin composite and the low-volatile solvent is preferably containing from 10 percent by weight to 80 percent by weight, both inclusive, of the polyolefin composite, more preferably containing from 15 percent by weight to 70 percent by weight, both inclusive, of the polyolefin composite provided the sum of both is 100 percent by weight. The reason is that if the weight of polyolefin composite is too small, imbibition occurs in the exit of the die or the neck-in becomes large at the time of molding so that molding of a sheet becomes difficult. On the other hand, if the volume of polyolefin is too large, preparation of the homogeneous solvent is difficult.

When molding the solvent with a high concentration of polyolefin composite by a sheet dice, it is preferable that a gap is, for example, from 0.1 mm to 5 mm, both inclusive. Also, it is preferable that the pressing temperature is from 140° C. to 250° C., both inclusive, and the pressing rate is from 2 cm/minute to 30 cm/minute, both inclusive.

Cooling is performed at least until the temperature at which the solvent galates and below. Examples of cooling methods are a method of making a direct contact with a cold wind, a coolant, or other cooling medium, and a method of making a contact with a roll cooled by a coolant. The solvent with a high concentration of polyolefin composite which is pushed out from the die may be taken back before or during the cooling process by a fraction of from 1 to 10, both inclusive, preferably 1 to 5, both inclusive. The reason is that if the fraction is too large, the neck-in becomes too large and breakings are easily generated when stretching the sheet, which is not preferable.

Stretching of the gel sheet is preferable to be performed by biaxial stretching with a tentering method, a roll method, a pressing method, or a combination of these methods after heating the gel sheet. At this time, simultaneous stretching in both longitudinal and lateral direction or sequential stretching maybe performed. However, the simultaneous two-dimensional stretching is specifically preferable. The stretching temperature is preferable to be the temperature, which is obtained by adding 10° C. to the melting point of polyolefin composite, and more, and is more preferable to be within the range of the dispersing temperature of crystal, inclusive, to the melting point, exclusive. If the stretching temperature is too high, the effective molecular chain orientation by stretching cannot be obtained due to dissolution of the resin, which is not preferable. If the stretching temperature is too low, the degree of softening the resin is insufficient so that the sheet is easily broken when being stretched. Thereby, stretching with high magnification cannot be performed.

After stretching the gel sheet, it is preferable to wash the stretched film with a volatile solvent and then remove the low-volatile solvent remaining. After washing, the stretched film is dried by applying a heat or sending an air and the washing solvent is volatilized. Examples of the washing solvents are: hydrocarbon such as pentane, hexane, and hebutane; chlorine hydrocarbon such as methylene chloride and carbon tetrachloride; carbon fluoride such as ethane trifluoride; and ether such as diethyl ether and dioxane, which have a volatilizing characteristic. The washing solvents are selected according to the low-volatile solvent used, and are used alone or by being mixed. Washing is performed by a method of soaking the stretched film in a volatile solvent, a method of sprinkling the volatile solvent over the film, or a combined method of these. Washing is performed until less than 1 percent by weight of the low-volatile solvent remains in the stretched film to 100 percent by weight of polyolefin composite.

The electrolyte 17 is obtained by dissolving lithium salt as an electrolyte salt in a non-aqueous solvent. A non-aqueous solvent is a non-aqueous compound with, for example, 10.0 mPa·s intrinsic viscosity and below at 25° C. It is preferable that the non-aqueous solvent contains at least either ethylene carbonate (EC) or propylene carbonate (PC) so that the cycle characteristic can be improved. It is more preferable to mix ethylene carbonate and propylene carbonate for use so that the cycle characteristic can be further improved.

However, when graphite is used for the negative electrode 15, the concentration of propylene carbonate in the non-aqueous solvent is preferable to be less than 30 percent by weight. Propylene carbonate exhibits relatively high reaction to graphite so that the characteristic is deteriorated if the concentration of propylene carbonate is too high. When the non-aqueous solvent contains ethylene carbonate and propylene carbonate, preferably the mass fraction (ethylene carbonate □propylene carbonate) of mixing ethylene carbonate with propylene carbonate in the non-aqueous solvent, which is the value obtained by dividing the content of ethylene carbonate by the content of propylene carbonate, is 0.5 and more.

It is also preferable that the non-aqueous solvent contains at least one kind of chain ester carbonates such as diethyl carbonate, dimethyl carbonate (DMC), ethyl methyl carbonate (EMC), and methyl propyl carbonate. Thereby, the cycle characteristic can be improved.

It is preferable that the non-aqueous solvent further contains at least either 2,4-difluoroanisole (DFA) or vinylene carbonate (VC). The reason is that 2,4-difluoroanisole can improve the discharging capacity and vinylene carbonate can further improve the cycle characteristic. It is especially preferable to use the combination of both so that the discharging capacity and the cycle characteristic can be improved at the same time.

It is preferable that the concentration of 2,4-difluoroanisole in the non-aqueous solvent is, for example, 15 percent by weight and below. The reason is that the discharging capacity cannot be improved if the concentration is too high. It is preferable that the concentration of vinylene carbonate in the non-aqueous solvent is, for example, 15 percent by weight and below. The reason is that the cycle characteristic cannot be improved if the concentration is too high.

Furthermore, the non-aqueous solvent may include one kind, or two kinds and more selected from the group consisting of butylene carbonate, γ-butylolactone, γ-valerolactone, these compounds in which a part or all of the hydrogen base is replaced with fluorine base, 1,2-dimethoxyethane, tetrahydrofuran, 2-methyl tetrahydrofuran, 1,3-dioxolane, 4-methyl-1, 3-dioxolane, methylacetate, methylpropionate, acetonitrile, glutaronitrile, adiponitrile, methoxyacetonitrile, 3-methoxypropylenitrile, N,N-dimethylformamid, N-methylpyrrolidinone, N-methyloxzolidinone, N,N-dimethylimidazolidinone, nitromethane, nitroethane, sulfolane, dimethylsulfoxyde, and trimethylphosphate.

Examples of appropriate lithium salt are $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCL, and LiBr. One of these alone, or two and more kinds of these are mixed for use. Especially, $LiPF_6$ is preferable so that a high ion conductivity can be obtained while further improving the cycle characteristic. The concentration of lithium salt to the non-aqueous salt is not specifically limited. However, it is preferable to lie within the range of 0.1 mol/dm$^3$ to 5.0 mol/dm$^3$, both inclusive, and is more preferable to lie within the range of 0.5 mol/dm$^3$ to 3.0 mol/dm$^3$, both inclusive. The reason is that the ion conductivity of the electrolyte 17 can be improved with the concentration within the above-mentioned range.

The secondary battery having such a configuration acts as follows:

When the secondary battery is charged, lithium ions are released from the positive electrode active material contained in the positive electrode mixture layer 13a, passed through the separator 16 via the electrolyte 17 and occluded first in the negative electrode material capable of occluding/releasing lithium contained in the negative electrode mixture layer 15a. When charging is continued, in the state where the open circuit voltage is lower than the overcharge voltage, the charging capacity goes beyond the charging capacity of the negative electrode material capable of occluding/releasing lithium so that lithium metal starts to precipitate on the surface of the negative electrode material capable of occluding/releasing lithium. Specifically, although it depends on the electrode material, lithium metal starts to precipitate on the surface of the negative electrode material capable of occluding/releasing lithium at a point where the open circuit voltage is within the range of 0 V and 4.2 V, both inclusive. Then, lithium metal continues to precipitate in the negative electrode 15 until the open circuit voltage reaches, for example, 4.2 V, that is when charging is completed. Thereby, the exteriority of the negative electrode mixture layer 15a changes from black to gold, and then to silver when using, for example, a carbonaceous material as the negative electrode material capable of occluding/releasing lithium.

Then, when the battery is discharged, first, lithium metal having precipitated in the negative electrode 15 is dissolved as ions, passes through the separator 16 via the electrolyte 17, and then is occluded in the positive electrode active material contained in the positive electrode mixture layer 13a. When discharging is further continued, ionic lithium occluded in the negative electrode material capable of occluding/releasing lithium in the negative electrode mixture layer 15a is released and occluded in the positive electrode active material.

In the secondary battery, lithium is occluded in the negative electrode material capable of occluding/releasing lithium in the beginning of charging, and lithium metal precipitates on the surface of the negative electrode material capable of occluding/releasing lithium at some midpoint of charging where the open circuit voltage is lower than the overcharge voltage. Therefore, both of so-called characteristics of a lithium secondary battery and a lithium-ion secondary battery of the related art can be obtained. In other words, a high energy density can be obtained while improving the cycle characteristic and boosting charging characteristic.

As described, the secondary battery according to the embodiment is formed to contain the negative electrode material capable of occluding/releasing lithium in the negative electrode 15 and precipitate lithium in the negative electrode 15 in the state where the open circuit voltage is lower than the overcharge voltage. Also, the capacity of the negative electrode 15 is expressed by the sum of the capacity which is obtained when occluding/releasing lithium in an ionic state and the capacity which is obtained when precipitating/dissolving lithium. Therefore, a high energy density can be obtained while improving the cycle characteristic and boosting charging characteristic.

Especially, enhanced effects can be obtained by utilizing occlusion/release of lithium performed by the negative electrode material capable of occluding/releasing lithium, which is contained in the negative electrode mixture layer 15a and by precipitating lithium on the surface of the negative electrode material.

Also, if the maximum amount of the light metal precipitating in the negative electrode at the maximum voltage of the open circuit voltage before reaching overcharge voltage is 0.05 times and more the charging capacity of the negative electrode, a higher energy density can be further obtained. If it is 3.0 times and below, the cycle characteristic and the boosting charging characteristic can be further improved.

Furthermore, if the ability of discharging capacity of the negative electrode material is 150 mAh/g and more and the negative electrode material contains 50 percent by weight and more of a negative electrode active material, the cycle characteristic and the boosting charging characteristic can be further improved.

In addition, if the thickness of the negative electrode mixture layer 15a is 10 μm and more, the cycle characteristic and the boosting charging characteristic can be further improved. If it is 300 μm and below, the amount of precipitation of lithium metal in the direction of thickness can be made homogeneous and the cycle characteristic can be improved.

Moreover, if a carbonaceous material is contained as the negative electrode material capable of occluding/releasing lithium, changes in the crystal structure generated at the time of charging/discharging are very small. Therefore, a higher energy density can be obtained and the cycle characteristic can further be improved.

In addition, if an oxide containing lithium is contained as the positive electrode active material in the positive electrode mixture layer 13a, a higher energy density can be obtained.

Furthermore, if metallic carbonate is contained in the positive electrode mixture layer 13a, if at least either ethylene carbonate or propylene carbonate is contained as a non-aqueous solvent in the electrolyte 17, and if $LiPF_6$ is contained as electrolyte salt in the electrolyte 17, the cycle characteristic and the boosting charging characteristic can be further improved.

In addition, if the concentration of propylene carbonate in the non-aqueous solvent is less than 30 percent by weight and the mass fraction of mixing ethylene carbonate with propylene carbonate is 0.5 and more, the cycle characteristic can be improved even if graphite is used as the negative electrode material.

Moreover, if the electrolyte 17 contains at least one kind selected from the group consisting of chain ester carbonate, 2,4-difluoroanisole, and vinylene carbonate as a non-aqueous solvent, the characteristic can be further improved.

[First Modification]

The above-mentioned first embodiment has been described by exemplifying a coin-type secondary battery. However, the invention can be also applied to secondary batteries having other shapes such as a button-type, a paper-type, a cylindrical-type having a spiral structure inside, or a square-type.

Figure 2:
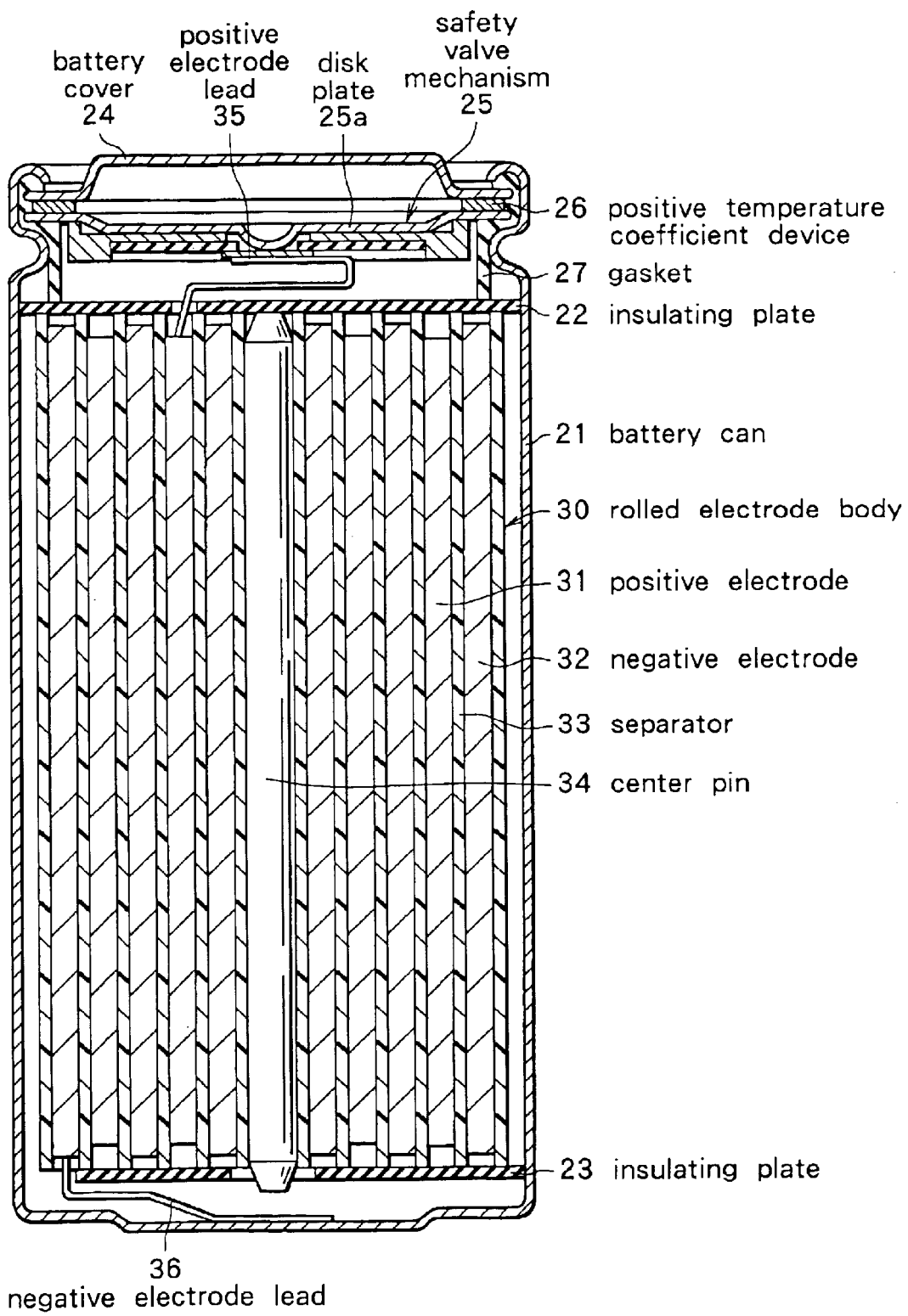
FIG. 2 is a cross section showing the configuration of a secondary battery according to a first modification of the invention.

FIG. 2 shows the cross-sectional configuration of a so-called cylindrical-type secondary battery. The secondary battery comprises a rolled electrode body 30 obtained by rolling a band-shaped positive electrode 31 and negative electrode 32 with a separator 33 interposed therebetween in a battery can 21 having a substantially hollow cylindrical column shape. The battery can 21 is made of, for example, iron (Fe) plated with nickel (Ni). One end of the battery can 21 is closed and the other end is open. A pair of insulating plates 22 and 23 are placed inside the battery can 21 vertical to the peripheral face of the roll so as to sandwich the rolled electrode body 30.

A battery cover 24, and a safety valve mechanism 25 and a positive temperature coefficient (PTC) 26, which are provided inside the battery cover 24, are attached to the open end of the battery can 21 by being caulked with a gasket 27 in between, and the battery can 21 is sealed. The battery cover 24 is made of, for example, a material similar to that of the battery can 21. The safety valve mechanism 25 is electrically connected to the battery can 24 via the PTC 26. When an internal short circuit occurs or the internal pressure of the battery exceeds a predetermined value due to heating from outside or the like, a disk plate 25a is turned upside down, thereby disconnecting the electrical connection between the battery cover 24 and the rolled electrode body 30. The PTC 26 is used to limit a current by increasing resistance when the temperature rises, thereby preventing abnormal heating caused by a heavy current. The PTC 26 is made of, for example, barium titanate based semiconductive agent ceramics. The gasket 27 is made of, for example, an insulating material and asphalt is applied over the surface.

The rolled electrode body 30 is rolled around, for example, a center pin 34 as a center. A positive electrode lead 35 made of aluminum (Al) or the like is connected to the positive electrode 31 and a negative electrode lead 36 made of nickel (Ni) or the like is connected to the negative electrode 32. The positive electrode lead 35 is electrically connected to the battery cover 24 by being welded to the safety valve mechanism 25 while the negative electrode lead 36 is electrically connected to the battery can 21 by being welded. The separator 33 between the positive electrode 31 and the negative electrode 32 is impregnated with an aqueous electrolyte.

In the secondary battery, the positive electrode 31, the negative electrode 32, the separator 33 and the aqueous electrolyte can be formed and prepared as in those of the first embodiment and the same effects can be obtained.

[Second Modification]

In the above-mentioned first embodiment, the secondary battery using the aqueous electrolyte which is an electrolyte in a state of liquid has been described. However, a solid electrolyte may be used instead of using the aqueous electrolyte. Thereby, the same or the better effects as those of the first embodiment can be obtained. Examples of the solid electrolytes are an organic solid electrolyte in which electrolyte salt is dissolved in a polymer compound, and a gel electrolyte in which an aqueous electrolyte (e.g., non-aqueous solvent and electrolyte salt) is dispersed or held in a polymer compound.

Examples of polymer compounds are ether polymer compounds such as a polyethylene oxide or a cross-link polyethylene oxide, ester polymer such as polymethacrylate, acrylate polymer compound, and fluorine polymer compound such as polyvinylidene fluororide or co-polymer of polyvinylidene fluororide and hexafluoropropylene. One of these alone or two and more kinds can be mixed for use. The same non-aqueous solvent and electrolyte salt as those of the first embodiment are used. The concentration of the electrolyte salt in the electrolyte is not specifically limited. However, for example, if a gel electrolyte is used, it is preferable that the concentration of the electrolyte salt to the non-aqueous solvent lies within the range of 0.1 mol/dm$^3$ to 5.0 mol/dm$^3$, both inclusive, and more preferable to lie within the range of 0.5 mol/dm$^3$ to 2.0 mol/dm$^3$, both inclusive.

Specific examples of the invention will be described in detail.

EXAMPLE 1-1, EXAMPLE 1-2

As Example 1-1, the same coin-type secondary battery as that shown in FIG. 1 was fabricated as follows. It will be described by referring to FIG. 1 using the same numeral references as those shown in FIG. 1.

First, lithium-cobalt composite oxide (LiCoO$_2$) as the positive electrode material was obtained by mixing lithium carbonate. (Li$_2$CO$_3$) and cobalt carbonate (CoCO$_3$) in the proportion of Li$_2$CO$_3$: CoCO$_3$=0.5:1 (molar fraction) and calcining it in the air at 900° C. for five hours. When the lithium-cobalt composite oxide obtained was measured by performing X-ray diffraction, the peak was very similar to that of LICoO$_2$ registered in JCPDS file. After pulverizing the lithium-cobalt composite oxide to be in a form of powder with the accumulated 50% particle diameter being 15 µm, which could be obtained by a laser diffraction, 91 parts by volume weight of the lithium-cobalt composite oxide powder, 6 parts by weight of graphite as a conductive agent, and 3 parts by weight of polyvinylidene fluoride as a binder were mixed in order to prepare the positive electrode mixture. Then, the positive electrode mixture was dispersed in N-methyl-2-pyrrolidone comprising a solvent to obtain slurry which was then homogeneously applied on one face of a positive electrode collector layer 13b made of 20 µm thick aluminum foil. It was then dried and compression-molded by a roll-presser in order to form a positive electrode mixture layer 13a. Then, it was stamped out to fabricate a circular-plate positive electrode 13.

Also, a non-graphitizing carbonaceous material having a characteristic similar to the glassy carbon as the negative electrode material capable of occluding/releasing lithium was obtained by calcining petroleum pitch at 1000° C. in an inert gas flow. When the non-graphitizing carbonaceous material obtained was measured by the X-ray diffraction, the interlayer spacing distance (002) plane was 0.376 nm. Also, the true density (true specific gravity) was measured to be 1.58 g/cm$^3$ according to "True density obtained by butanol method" defined in JIS7212.

After pulverizing non-graphitizing carbonaceous material to be in a form of powder with the mean particle diameter being 1 µm, 90 parts by volume of the non-graphitizing carbonaceous material powder and 10 parts by volume of polyvinylidene fluoride as a binder were mixed in order to prepare the negative electrode mixture. Then, the negative electrode mixture was dispersed in a solvent, N-methyl-2-pyrrolidone, to obtain slurry which was then homogeneously applied on one face of a negative electrode collector layer 15b made of copper foil 10 µm thick. It was then dried and compression-molded by a roll-presser in order to form a negative electrode mixture layer 15a 80 µm thick. Then, it was stamped out to fabricate a circular-plate negative electrode 15.

After fabricating each of the positive electrode 13 and the negative electrode 15, a spacer 12 made of copper, the positive electrode 13, a separator 16 made of microporous polypropylene film 50 µm thick, the negative electrode 15, and an exterior cup 14 were stacked in this order inside an exterior can 11. Then, an electrolyte 17 was injected inside the exterior can 11. The electrolyte 17 was obtained by dissolving 1 mol/dm$^3$ of lithium salt, LiPF$_6$, in a non-aqueous solvent in which 50 percent by volume of propylene carbonate and 50 percent by volume of dimethyl carbonate were mixed. Then, the peripheral edges of the exterior can 11 were sealed by caulking with an insulating gasket 18 in between. Thereby, a secondary battery having the diameter of 20 mm and the height of 1.6 mm was obtained.

The secondary battery is overcharged when the open circuit voltage goes beyond 4.2 V. Therefore, when charging, the balance of the positive electrode 13 and the negative electrode 15 was set so that the charging capacity exceeded the ability of charging capacity of the non-graphitizing carbonaceous material contained in the negative electrode 15 and lithium metal precipitated in the negative electrode 15 before the open circuit voltage reached 4.2 V. Specifically, when the ability of charging/discharging capacity of the non-graphitizing carbonaceous material used here was measured, the ability of charging capacity was 500 mAh/g, and the ability of discharging capacity was 400 mAh/g. Thereby, the amount of lithium occluded in the non-graphitizing carbonaceous material at the time of charging to 4.2 V was to be 500 mAh per 1 g of the non-graphitizing carbonaceous material, and the amount of precipitating lithium metal in the negative electrode 15 was set to be 250 mAh per 1 g of the non-graphitizing carbonaceous material. In other words, it was set so that the maximum amount of lithium metal precipitating in the negative electrode 15 at the maximum voltage before the open circuit voltage reached the overcharge voltage was 0.5 times the ability of the charging capacity of the non-graphitizing carbonaceous material.

At this time, the ability of charging and discharging of the non-graphitizing carbonaceous material was obtained in the following manner. First, a coin-cell with the negative electrode 15 used in the secondary battery and lithium metal being the opposite electrode was fabricated and constant-current charging was performed until reaching 0 V at a current of 0.2 C (1.56 mA). Then, after performing constant-current charging for a sufficient length of time until the current was further contracted, discharging was performed until reaching 2.5 V at a constant current of 0.01 C (0.078 mA). At this time, the charging capacity and the discharging capacity were obtained, respectively, and designated as the ability of the charging capacity and discharging capacity. At this time, the capacities per 1 g of the non-graphitizing carbonaceous material were obtained, respectively.

The cycle characteristic and the boosting charging characteristic of the obtained secondary battery were studied, respectively, by performing a general charging/discharging test and a boosting charging/discharging test as follows. At this time, in the general charging/discharging test, 1 cycle of charging/discharging was performed as follows: a constant-current charging was performed at a constant current of 1 mA until the closed circuit voltage (battery voltage) reached 4.2 V; a constant-voltage charging was performed at a constant voltage of 4.2 V until the total time of charging reached 10 hours; and a constant-current discharging was performed at a constant current of 1 mA until the open circuit voltage reaches 3.0 V. Also, in the boosting charging/discharging test, 1 cycle of charging/discharging was performed as follows: a constant-current charging was performed at a constant current of 5 mA until the closed circuit voltage reached 4.2 V; a constant-voltage charging was performed at a constant voltage of 4.2 V until the total time of charging reached 3 hours, and a constant-current discharging was performed at a constant current of 5 mA until the open circuit voltage reached 3.0 V. It becomes a full-charged state and a complete-discharged state by performing charging/discharging under the condition as described.

In the manner as described, 100 cycles of charging/discharging were performed in the general charging/discharging test and the boosting charging/discharging test. Then, the capacity retention rate in the 100th cycle to the 1st cycle in each test was obtained from the 1st discharging capacity and the 100th discharging capacity. The charging/discharging in each test was performed at 23° C. The results are shown in Table 1, respectively.

When the secondary battery was decomposed after charging the battery at a constant current of 0.1 C (0.78 mA) until the open circuit voltage reached 3.7 V, there was no precipitation of lithium metal in the negative electrode 15. When the secondary battery was decomposed after charging in the same manner but this time until the open circuit reached 4.1 V, precipitation of lithium metal was observed in the negative electrode 15. In other words, it was verified that in the secondary battery, lithium metal precipitated in the negative electrode 15 at some midpoint during charging where the open circuit was lower than the overcharge voltage.

As Example 1-2, a secondary battery was fabricated in the same manner as in Example 1-1 except that a lithium metal layer (not shown), which functions as a negative electrode active material, was pasted on the negative electrode mixture layer 15a on the positive electrode 13 side. At this time, the proportion of lithium metal and the non-graphitizing carbonaceous material in the negative electrode active material were set so that 60 percent by volume of lithium metal and 40 percent by volume of the non-graphitizing carbonaceous material were contained. In the secondary battery, the general charging/discharging test and the boosting charging/discharging test were also performed in the same manner as in Example 1-1, respectively. The results are also shown in Table 1, respectively.

As Comparative Example 1-1 to the embodiment, a secondary battery was fabricated in the same manner as in Example 1-1 except that the negative electrode was formed of lithium metal. In the secondary battery, the general charging/discharging test and the boosting charging/discharging test were also performed in the same manner as in Example 1-1, respectively. The results are also shown in Table 1, respectively.

As can be seen from Table 1, with regard to Example 1-1 and Example 1-2, in both of the general charging/discharging test and the boosting charging/discharging test, the charging capacity of the 1st cycle was almost equivalent to that of Comparative Example 1-1 and the capacity retention rate was higher than that of Comparative Example 1-1. In Example 1-2, the capacity retention rate was slightly improved compared to Comparative Example 1-1. On the contrary, in Example 1-1, the capacity retention rate was substantially improved compared to Comparative Example 1-1 and a high capacity retention rate was obtained. It may be considered that the capacity retention rate was not sufficiently improved in Example 1-2 since the lithium metal layer was pasted on the negative electrode mixture layer 15a on the positive electrode 13 side and therefore the non-graphitizing carbonaceous material was not contributed in charging/discharging, thus precipitating/dissolving of lithium metal were repeated on the surface of the lithium metal layer as in the Comparative Example 1-1.

In short, it has been learned that a high charging/discharging capacity can be obtained while improving the cycle characteristic and the boosting charging characteristic if the negative electrode 15 contains the negative electrode material capable of occluding/releasing lithium and lithium precipitates in the negative electrode 15 in the state where the open circuit voltage is lower than the overcharge voltage. Especially, as in Example 1-1, it has been learned that the cycle characteristic and the boosting charging characteristic can be further improved by utilizing occlusion/release of lithium performed by the negative electrode material capable of occluding/releasing lithium and by precipitating lithium metal on the negative electrode capable of occluding/releasing lithium.

EXAMPLE 1-3 TO EXAMPLE 1-8

As Example 1-3 to Example 1-8, secondary batteries were fabricated, respectively, in the same manner as in Example 1-1 except that the relation of the charging capacity of the non-graphitizing carbonaceous material and the capacity of precipitating lithium metal in the negative electrode 15 when charging until the open circuit voltage reached 4.2 V was changed as shown in Table 2. At this time, the same non-graphitizing carbonaceous material as that used in Example 1-1 was used, and the amount of precipitation of lithium metal was changed, respectively, to adjust the balance of the positive electrode 13 and the negative electrode 15 so that the relation of the ability of charging capacity of the non-graphitizing carbonaceous material and the amount of precipitating lithium metal corresponded to those as shown in Table 2. In the secondary battery, the general charging/discharging test and the boosting charging/discharging test were also performed in the same manner as in Example 1-1, respectively. The results are shown in Table 2, respectively, along with the results of Example 1-1.

As Comparative Example 1-2 for the embodiment, a secondary battery was fabricated in the same manner as in Example 1-1 except that the balance of the positive electrode 13 and the negative electrode 15 were set so that lithium metal did not precipitate in the negative electrode when the battery was charged until the open circuit voltage reached 4.2 V. When the secondary battery was decomposed after charging the battery at a constant current of 0.1 C (0.59 mA) until the open circuit voltage reached 4.1 V, there was no precipitation of lithium metal in the negative electrode 15. When the secondary battery was decomposed after charging in the same manner but this time until the open circuit reached 4.2 V, it was verified that there was no lithium metal precipitating in the negative electrode 15. In other words, it-was verified that in the secondary battery, lithium metal did not precipitate in the negative electrode 15 at some midpoint during charging where the open circuit was lower than the overcharge voltage. In the secondary battery, the general charging/discharging test and the boosting charging/discharging test were also performed in the same manner as in Example 1-1, respectively. The results are shown in Table 2, respectively, along with the results of Example 1-1.

As can be seen from Table 2, in both of the general charging/discharging test and the boosting charging/discharging test in Example 1-1, and Example 1-3 to Example 1-6, a higher capacity retention rate was obtained, respectively, compared to that of Comparative Example 1-1. In Example 1-7, the capacity retention rate in the boosting charging/discharging test was higher compared to that of Comparative Example 1-1 and the capacity retention rate in the general charging/discharging test was equivalent to that of Comparative Example 1-1. With regard to Example 1-1 and Example 1-3 to Example 1-8, in both of the charging/discharging test and the boosting charging/discharging test, the discharging capacity of the 1st cycle was higher than that of Comparative Example 1-2.

With regard to Example 1-1 and Example 1-3 to 1-8, as the amount of precipitating lithium metal became larger, the discharging capacity in the general charging/discharging test became larger but the capacity retention rate decreased. In the boosting charging/discharging test, deterioration in the capacity retention rate was profound as the amount of precipitating lithium metal became larger. The discharging capacity of the 1st cycle became larger until the amount of precipitating lithium reached about twice the ability of charging capacity of the non-graphitizing carbonaceous material, and then became smaller. This indicates that the charging/discharging efficiency deteriorates when the amount of precipitating lithium metal becomes too large, which corresponds to the fact that the discharging capacity was not so large in Comparative Example 1-1 in which lithium metal was used for the negative electrode.

In short, the discharging capacity can be sufficiently improved when the fraction of the amount of precipitating lithium metal to the ability of charging capacity of the negative electrode material capable of occluding/releasing lithium is 0.05 and more, and when it is 3.0 and below, the cycle characteristic and the boosting charging/discharging characteristic can be improved. Thereby, the shortcomings of the lithium secondary battery of the related art can be improved.

EXAMPLE 1-9 TO EXAMPLE 1-14

As Example 1-9 to Example 1-14, secondary batteries were fabricated, respectively, in the same manner as in Example 1-1 except that the ability of discharging capacity of the non-graphitizing carbonaceous material was changed as shown in Table 3, respectively. At this time, the balance of the positive electrode 13 and the negative electrode 15 was adjusted so that the discharging capacity of the 1st cycle became almost the same as that of Example 1-3. The ability of discharging capacity of the non-graphitizing carbonaceous material was obtained in the same manner as in Example 1-1, respectively. In the secondary batteries, the general charging/discharging test and the boosting charging/discharging test were also performed in the same manner as in Example 1-1, respectively. The results are shown in Table 3. The results of Example 1-3, Comparative Example 1-1, and Comparative Example 1-2 are also shown in Table 3, respectively. The ability of discharging capacity of the non-graphitizing carbonaceous material in Example 1-3 was 400 mAh/g as in Example 1-1.

As can be seen from Table 3, with regard to Example 1-3 and Example 1-9 to Example 1-14, in both of the general charging/discharging test and the boosting charging/discharging test, the higher capacity retention rate was obtained compared to the Comparative Example 1-1 and the higher discharging capacity of the 1st cycle was obtained compared to Comparative Example 1-2. Further, with regard to Example 1-3 and Example 1-9 to 1-14, in both of the general charging/discharging test and the boosting charging/discharging test, as the ability of discharging capacity of the non-graphitizing carbonaceous material was higher, the capacity retention rate became higher. It may be due to the fact that the amount of precipitating lithium metal can be made relatively smaller as the ability of occluding/releasing of the non-graphitizing carbonaceous material became larger.

In short, it is verified that the charging/discharging characteristic and the boosting charging/discharging cycle characteristic can be further improved when the ability of discharging capacity of the negative electrode material capable of occluding/releasing lithium is 150 mAh/g and more.

EXAMPLE 1-15 TO EXAMPLE 1-21

As Example 1-15 to Example 1-21, secondary batteries were fabricated, respectively, in the same manner as in Example 1-1 except that the thickness of the negative electrode mixture layer 15a in the direction opposite to the positive electrode 13 was changed as shown in Table 4. At this time, the balance of the positive electrode 13 and the negative electrode 15 was adjusted so that the fraction of the amount of precipitating lithium metal to the ability of charging capacity of the non-graphitizing carbonaceous material became almost the same (that is, 0.1) as that of Example 1-3. In the secondary batteries, the general charging/discharging test and the boosting charging/discharging test were also performed in the same manner as in Example 1-1, respectively. The results are shown in Table 4, respectively, along with the results of Example 1-3. The thickness of the negative electrode mixture layer 15a in Example 1-3 was 80 μm as in Example 1-1.

As can be seen from Table 4, in both the general charging/discharging test and the boosting charging/discharging test, the thicker the negative electrode mixture layer 15a became, the lower the capacity retention rate became. It may be due to the fact that lithium metal heterogeneously precipitates in the thickness direction if the negative electrode mixture layer 15a is too thick. In other words, it is verified that the charging/discharging characteristic and the boosting charging/discharging characteristic can be further improved by setting the thickness of the negative electrode mixture layer 15a to be 300 μm and below. However, if the thickness of the negative electrode mixture layer 15a is too thin, the amount of precipitation of lithium metal becomes relatively too large. Therefore, it is considered that preferably the thickness of the negative electrode mixture layer 15a is 10 μm and more.

EXAMPLE 1-22

As Example 1-22, a secondary battery was fabricated in the same manner as in Example 1-1 except that the positive electrode mixture was prepared by mixing 90 parts by weight of lithium-cobalt composite oxide ($LiCoO_2$), 6 parts by weight of graphite, 3 parts by weight of polyvinylidene fluoride, and 1 part by weight of lithium carbonate ($Li_2CO_3$). In the secondary battery, the general charging/discharging test and the boosting charging/discharging test were also performed in the same manner as in Example 1-1, respectively. The results are shown in Table 5, respectively, along with the results of Example 1-1.

As can be seen from Table 5, in both the general charging/discharging test and the boosting charging/discharging test in Example 1-22, the retention rate was higher that that of Example 1-1. It may be due to the fact that lithium carbonate was partially resolved in the positive electrode 13 and a stable coating was formed on the negative electrode 15. In short, it is verified that the charging/discharging characteristic and the boosting charging/discharging characteristic can be further improved if the positive electrode 13 is formed containing lithium carbonate. Incidentally, although it is not described in detail at this time, the same effects can be obtained by using metallic carbonate other than lithium carbonate.

EXAMPLE 1-23 TO EXAMPLE 1-27

As Example 1-23 to Example 1-27, secondary batteries were fabricated, respectively, in the same manner as in Example 1-1 except that the non-aqueous solvent or the electrolyte salt in the electrolyte 17 was changed as shown in Table 6. In the section of the non-aqueous solvent in Table 6, PC represents propylene carbonate; DMC represents dimethyl carbonate; and EC represents ethyl carbonate, respectively, and the numbers in brackets represent the mixing ratio (volume %). In the secondary batteries the general charging/discharging test and the boosting charging/discharging test were also performed in the same manner as in Example 1-1, respectively. The results are shown in Table 6, respectively, along with the results of Example 1-1.

As can be seen from Table 6, in Example 1-1 and Example 1-23 to Example 1-27 in which propylene carbonate or ethylene carbonate was used, excellent capacity retention rates were obtained. In Example 1-24 and Example 1-26, in which both propylene carbonate and ethylene carbonate were used, higher capacity retention rates were obtained than Example 1-1, Example 1-23, and Example 1-25, in which either one of them was used. Also, higher capacity retention rates were obtained in Example 1-1 and Example 1-24, in which dimethyl carbonate was used, than Example 1-25 and Example 1-26, in which dimethyl carbonate was not contained. In addition, a higher capacity retention rate was obtained in Example 1-1 in which $LiPF_6$ was used than Example 1-27 in which $LiBF_4$ was used.

In short, it is verified that the charging/discharging characteristic and the boosting charging/discharging characteristic can be further improved if the electrolyte 17 contains propylene carbonate or ethylene carbonate and can be further improved by containing both. Also, the characteristics can be similarly improved by containing dimethyl carbonate in the electrolyte 17 or containing $LiPF_6$ in the electrolyte 17. Incidentally, although not described in detail at this time, the same effects can be obtained by using chain ester carbonate other than dimethyl carbonate.

EXAMPLE 1-28

As Example 1-28, a secondary battery was fabricated in the same manner as in Example 1-1 except that graphite was used as the negative electrode material capable of occluding/releasing lithium, and the electrolyte 17 was obtained by dissolving 1 mol/dm³ of $LiPF_6$ in a non-aqueous solvent in which 50 percent by volume of ethylene carbonate and 50 percent by volume of dimethyl carbonate were mixed. The graphite used was KS-75 (interlayer spacing distance (002) plane is 0.3358 nm), the product of Lonza Ltd. In the secondary battery, the general charging/discharging test and the boosting charging/discharging test were also performed in the same manner as in Example 1-1, respectively. The results are shown in Table 7, respectively, along with the results of Example 1-1.

As can be seen from Table 7, the results of Example 1-28 equivalent to those of Example 1-1 were obtained. In other words, it is verified that similar effects can be obtained by using graphite as the negative electrode material capable of occluding/releasing lithium. Incidentally, although not described in detail at this time, the same effects can be obtained by using materials other than the ones used in Example 1-1 and Example 1-28 as the negative electrode material capable of occluding/releasing lithium.

EXAMPLE 1-29

As Example 1-29, a secondary battery using a gel electrolyte instead of the electrolyte 17 was fabricated. First, the positive electrode 13 and the negative electrode 15 were formed, respectively, in the same manner as in Example 1-1. Then, a gel electrolyte was formed on each surface of the negative electrode mixture layer 15a and the positive electrode mixture layer 13a. The gel electrolyte was obtained in the following manner. First, an electrolyte was prepared by dissolving 1 mol/dm³ of $LiPF_6$ in a non-aqueous solvent in which 50 percent by volume of propylene carbonate and 50 percent by volume of dimethyl carbonate were mixed. Then, a mixed solvent obtained by mixing 30 parts by weight of the obtained electrolyte, 10 parts by weight of block co-polymer of polyvinylidene fluoride and polyhexafluoropropylene, which was a polymer compound, and 60 parts by weight of dimethyl carbonate was homogeneously applied on the surface of the positive electrode mixture layer 15a and the positive electrode mixture layer 13a, and then dimethyl carbonate was evaporated and removed by leaving it for 8 hours at room temperature. Then, the negative electrode 13 and the positive electrode 15 were compressed and fixed with the sides to which the gel electrolyte was applied facing each other, and was enclosed inside the battery can 11. Thereby, a secondary battery was fabricated in the same manner as in Example 1-1.

In the secondary battery, the general charging/discharging test and the boosting charging/discharging test were also performed in the same manner as in Example 1-1, respectively. The results are shown in Table 8. The results of Example 1-1, Example 1-26, and Comparative Example 1-1 are also shown in Table 8, respectively. In Example 1-26, a non-aqueous electrolyte obtained by mixing 50 percent by volume of ethylene carbonate and 50 percent by volume of dimethyl carbonate was used as the electrolyte 17.

As can be seen from Table 8, the results of Example 1-29 equivalent to those of Example 1-1 were obtained. Also, when Example 1-26 and Example 1-29, in which the same non-aqueous solvent was used as the electrolyte were compared, a higher capacity retention rate was obtained in Example 1-29 in which the electrolyte was held by a polymer compound. In other words, it is verified that same effects can be obtained by using the gel electrolyte, and the charging/discharging cycle characteristic and the boosting charging/discharging characteristic can be further improved. Incidentally, although not described in detail at this time, the same effects can be obtained by using a solid organic electrolyte in which electrolyte salt is dissolved in a polymer compound, other than the gel electrolyte in which the electrolyte is dispersed or held in/by the polymer compound.

EXAMPLE 2-1 TO EXAMPLE 2-4

As Example 2-1 to Example 2-4, the same cylindrical-type secondary batteries as shown in FIG. 2 were fabricated in the following manner. It will be described by referring to FIG. 2 using the same reference numerals as shown in FIG. 2.

First, lithium-cobalt composite oxide powder obtained in the same manner as in Example 1-1 was prepared. Then, a positive electrode mixture was prepared by mixing 94 parts by weight of the mixture in which 5 parts by weight of lithium carbonate powder was mixed with 95 parts by weight of the lithium-cobalt composite oxide powder, 3 parts by weight of ketjen black as a conductive agent, and 3 parts by weight of polyvinylidene fluoride as a binder. The positive electrode mixture was dispersed in a solvent such as N-methyl-2-pirrolidone, thereby obtaining a positive electrode mixture slurry. The positive electrode mixture slurry was applied on both sides of the positive electrode collector layer made of aluminum foil band 20 $\mu$m thick and then the solvent was dried. Then, a positive electrode mixture layer was formed by performing compression-mold thereon. Thereby, a positive electrode 31 was fabricated. At this time, the total thickness of the positive electrode 31, which is the sum of the thickness of the positive electrode collector layer and the positive electrode mixture layer, was formed to be 150 $\mu$m. Then, a positive electrode lead 35 made of aluminum was fixed to one end of the positive electrode collector layer.

Artificial graphite with the ability of 320 mAh/g charging capacity was prepared as the negative electrode material. Then, a negative electrode mixture was prepared by mixing 90 parts by weight of the artificial graphite and 10 parts by weight of polyvinylidene fluoride as a binder. The negative electrode mixture was dispersed in a solvent such as N-methyl-pirrolidone, thereby obtaining a negative electrode mixture slurry. The negative electrode mixture slurry was applied on both sides of the negative electrode collector layer made of copper foil band 15 $\mu$m thick and then the solvent is dried. Then, a negative electrode mixture layer was formed by performing compression-mold thereon. Thereby, a negative electrode 32 was fabricated. At this time, in Example 2-1 to Example 2-4, the balance of the positive electrode 31 and the negative electrode 32 was changed, respectively by changing the total thickness of the negative electrode collector layer and the negative electrode mixture layer as shown in Table 9. Then a positive electrode lead 36 made of nickel was fixed to one end of the negative electrode collector layer.

After fabricating the positive electrode 31 and the negative electrode 32, respectively, a separator 33 made of microporous polyethylene stretched film of 27 $\mu$m in thickness was prepared. The negative electrode 32, the separator 33, the positive electrode 31, and the separator 33 were stacked in this order and the stacked body was rolled a number of times, thereby obtaining a rolled electrode body 30 with the outer diameter of 14 mm.

After fabricating the rolled electrode body 30, the rolled electrode body 30 was sandwiched by a pair of insulating plates 22 and 23, the negative electrode lead 36 was welded to a battery can 21, and the positive electrode lead 35 was welded to the safety valve mechanism 25. Then, the rolled electrode body 30 was enclosed inside the battery can 21 made of nickel-plated iron. Then, an electrolyte was injected inside the battery can 21. The electrolyte used was obtained by dissolving 1.5 mol/dm$^3$ of LiPF$_6$ as an electrolyte salt in a non-aqueous solvent in which the same volume of propylene carbonate and dimethyl carbonate were mixed.

After injecting the electrolyte inside the battery can 21, a battery can 21 was sealed by caulking a battery cover 24 with a gasket 27 in between to which asphalt was applied. Thereby, a secondary battery having the diameter of 14 mm and the height of 65 mm was obtained.

In the secondary battery, as in Example 1-1, the balance of the positive electrode 31 and the negative electrode 32 was adjusted so that lithium metal precipitated in the negative electrode 32 before the open circuit voltage reached 4.2 V at the time of charging, since the battery became overcharged when the open circuit voltage was over 4.2 V.

A charging/discharging test was performed on the secondary batteries obtained in Example 2-1 to Example 2-4, thereby obtaining the energy density and the discharging capacity retention rate, respectively. At this time, charging was performed at a constant current of 400 mA until the battery voltage reached 4.2 V, and then continued until the total charging time reached 4 hours at a constant voltage of 4.2 V. The voltage between the positive electrode 31 and the negative electrode 32 right before the completion of charging was 4.2 V and the current was 5 mA and below. On the other hand, discharging was performed at a constant current of 400 mA until the battery voltage reached 2.75V. The battery becomes a full-charged state and a complete-discharged state by performing charging/discharging under the condition as described. The discharging capacity retention rate was obtained as a fraction of the discharging capacity of the 300th cycle to the discharging capacity of the 2nd cycle provided that the discharging capacity and the energy density of the battery was the discharging capacity and the energy density of the 2nd cycle. The results obtained are shown in Table 9, respectively.

In Example 2-1 to Example 2-4, the secondary battery in a full-charged state after performing the 2nd cycle was decomposed and the solid $^7$Li-NMR spectrum in the negative electrode material was measured. At this time, the negative electrode 32 was taken out from the secondary battery; washed with a large quantity of dimethyl carbonate; and completely dried in a hot dryer at 60° C. Then, the negative electrode mixture layer was separated from the negative electrode collector layer, thereby obtaining a sample material for measurement. A series of works to obtain the sample material for measurement was performed in an atmosphere between the dew point and 50° C. Fourier transform NMR (FTNMR) apparatus (product of JEOL Ltd.; GSX270, external magnetic field; 6.34T) was used as the measuring apparatus and measurement was performed by a cross polarization method and a magic angle spinning method (so-called CPMAS). The integrating number was 50 and the measurement temperature was 27° C. As an external standard material, powder of lithium chloride (LiCL), which is an ionic crystal, was used and the solid $^7$Li-NMR spectrum was measured under the same condition as in Example 2-1 to Example 2-4. Also, the solid $^7$Li-NMR spectrum of lithium metal was measured using a thin-plate sample material under the same condition as those of Example 2-1 to Example 2-4.

Figure 3:
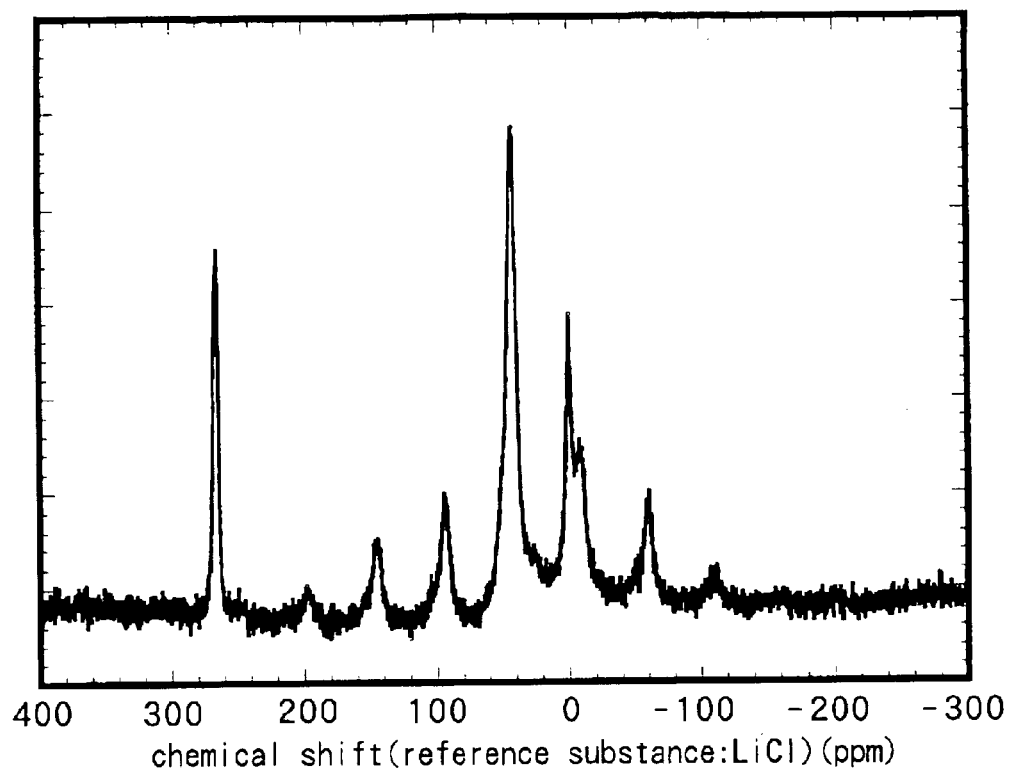
FIG. 3 shows the solid $^7$Li polynuclear species nuclear magnetic resonance spectrum (solid $^7$Li-NMR spectrum) of a negative electrode according to Example 2-1 of the invention.
Figure 4:
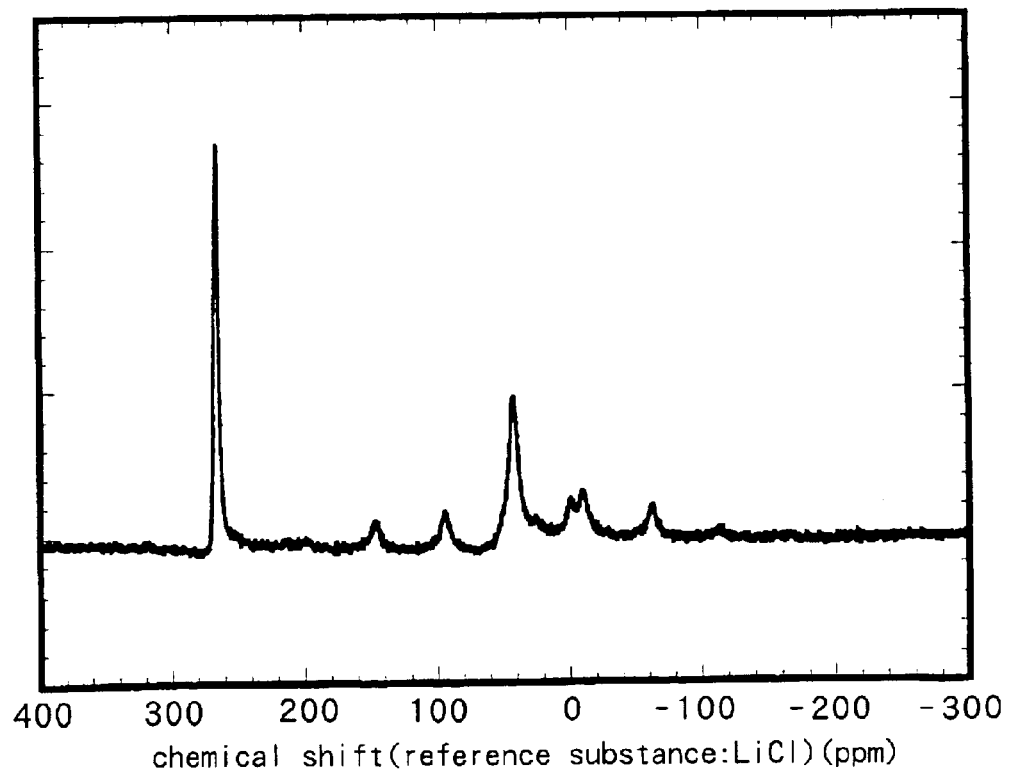
FIG. 4 shows the solid $^7$Li-NMR spectrum of a negative electrode according to Example 2-2 of the invention.
Figure 5:
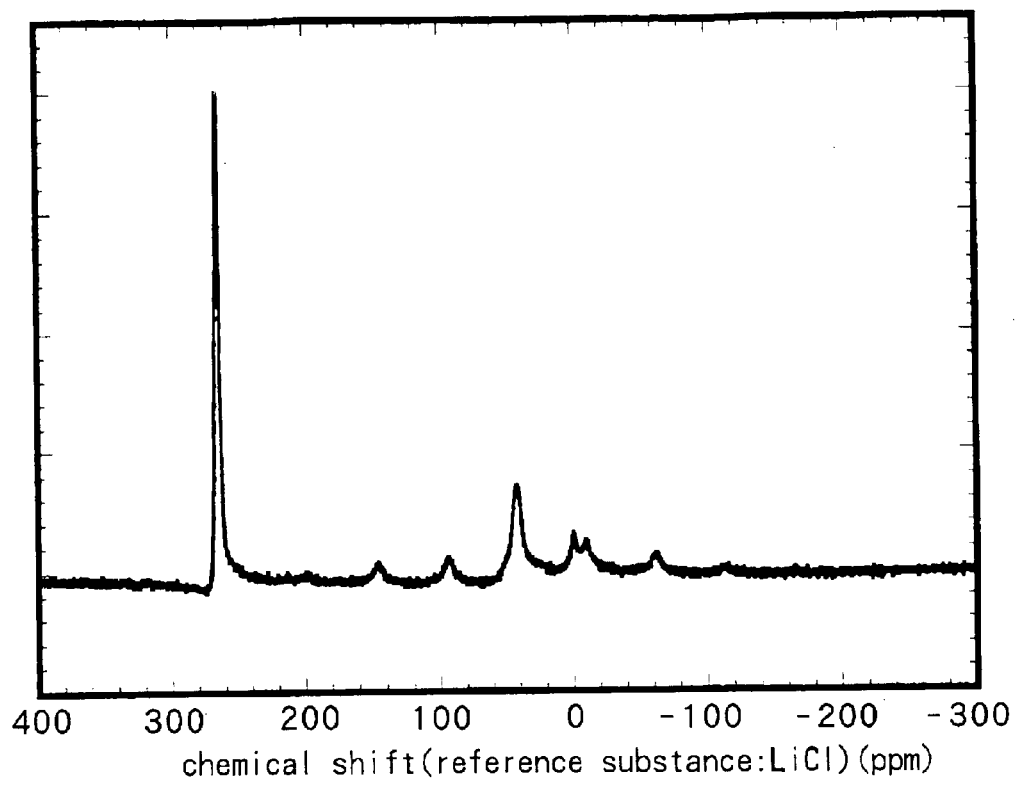
FIG. 5 shows the solid $^7$Li-NMR spectrum of a negative electrode according to Example 2-3 of the invention.
Figure 6:
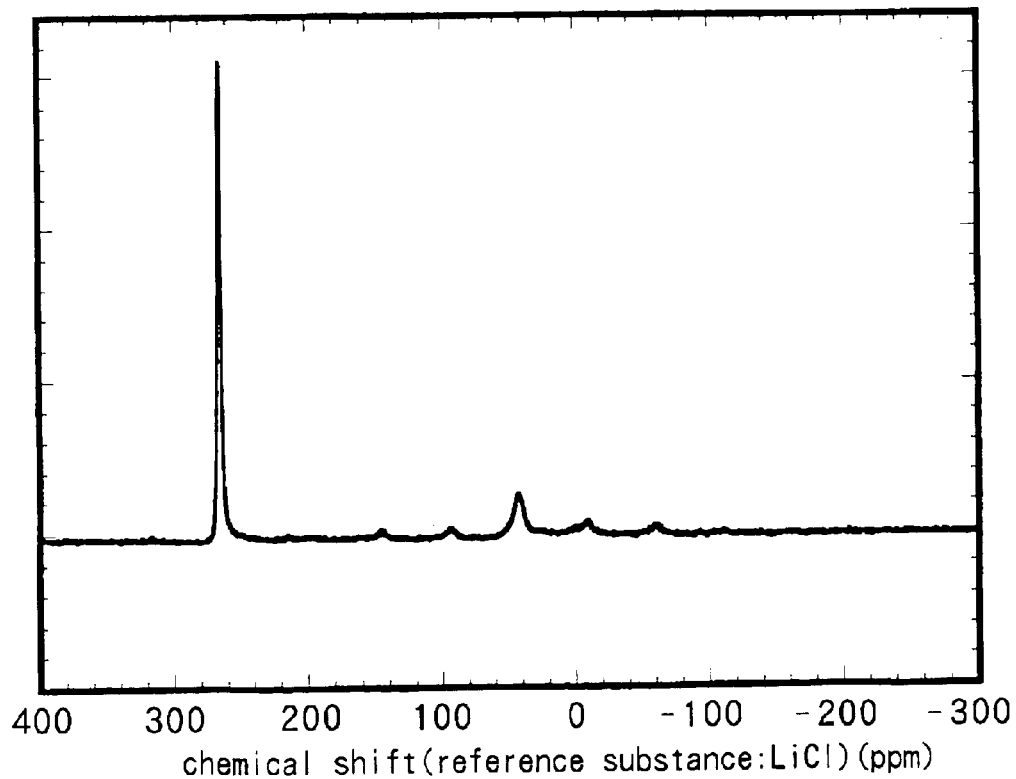
FIG. 6 shows the solid $^7$Li-NMR spectrum of a negative electrode according to Example 2-4 of the invention.
Figure 7:
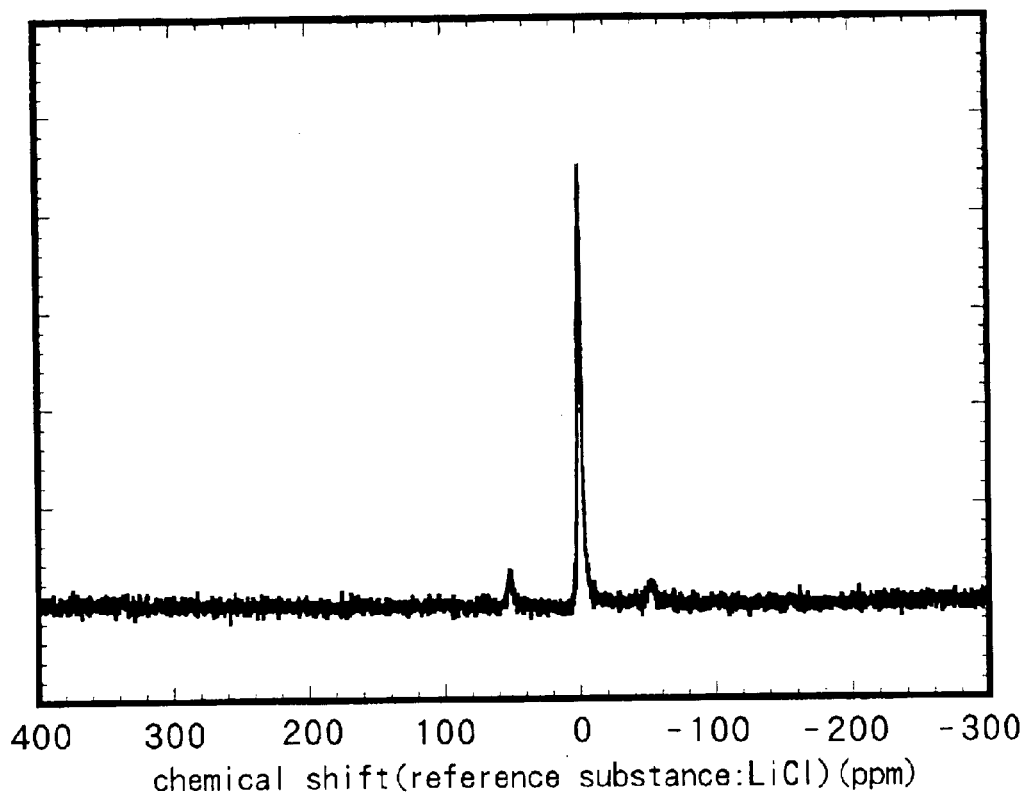
FIG. 7 shows the solid $^7$Li-NMR spectrum of lithium chloride which is an outer standard substance.
Figure 8:
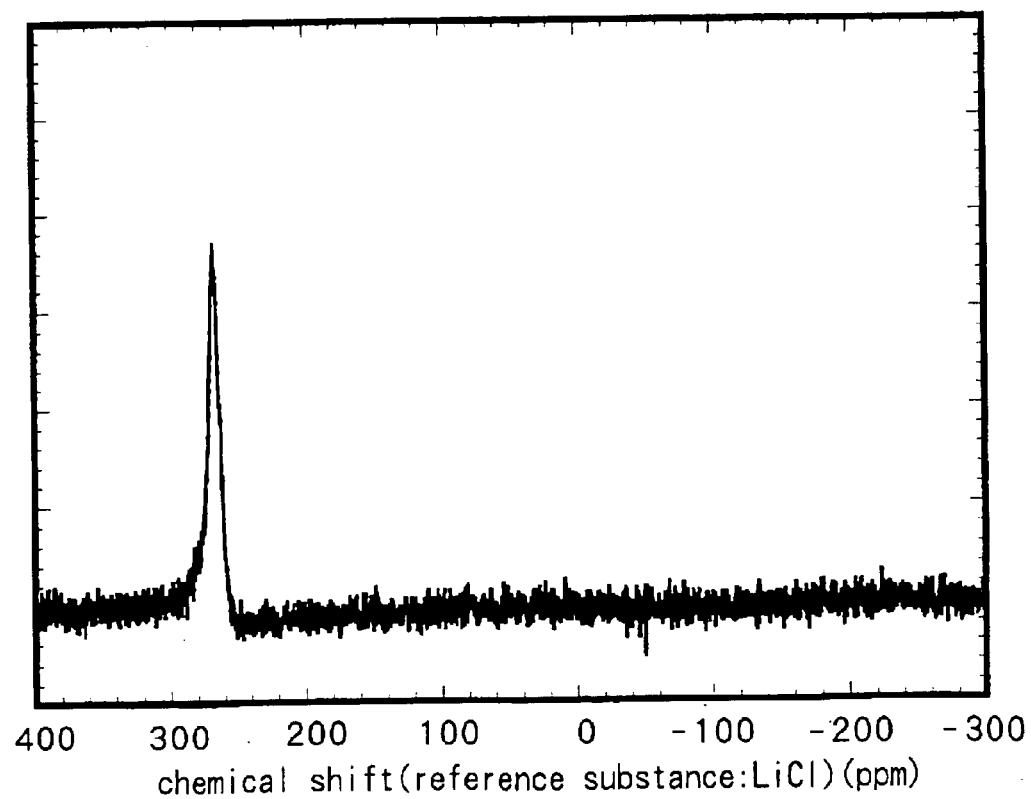
FIG. 8 shows the solid $^7$Li-NMR spectrum of lithium metal.

The results are shown in FIG. 3 to FIG. 8, respectively. FIG. 3 is the solid $^7$Li-NMR spectrum in Example 2-1; FIG. 4 is the solid $^7$Li-NMR spectrum in Example 2-2; FIG. 5 is the solid $^7$Li-NMR spectrum in Example 2-3; FIG. 6 is the solid $^7$Li-NMR spectrum in Example 2-4; FIG. 7 is the solid 7 Li-NMR spectrum of lithium chloride which is an external standard material; and FIG. 8 is the solid $^7$ Li-NMR spectrum of lithium metal.

As Comparative Example 2-1 for the embodiment, a secondary battery was fabricated in the same manner as in Example 2-1 to Example 2-4 except that the negative electrode mixture layer was made of lithium metal foil and the total thickness of the negative electrode was 140 μm. Also, as Comparative Example 2-2 and Comparative Example 2-3 for the embodiment, secondary batteries were fabricated in the same manner as in Example 2-1 to Example 2-4 except that the total thickness of the negative electrode was changed as shown in Table 9 and lithium metal did not precipitate in the negative electrode under the state where the open circuit voltage was lower than the overcharge voltage. The secondary batteries in Comparative Example 2-2 and Comparative Example 2-3 were lithium-ion secondary battery on the market.

Figure 9:
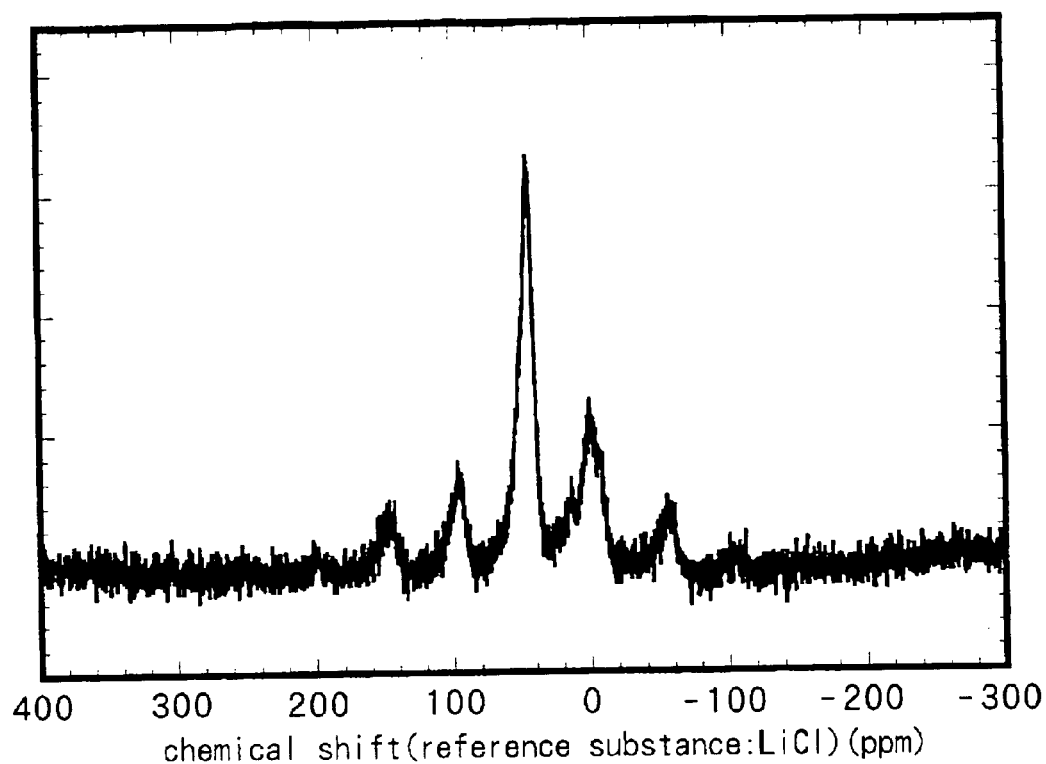
FIG. 9 shows the solid $^7$Li-NMR spectrum of a negative electrode according to Comparative Example 2-2 of the invention.

The discharging capacity, the energy density and the discharging capacity retention rate of the batteries in Comparative Example 2-1 to Comparative Example 2-3 were also obtained, respectively, in the same manner as in Example 2-1 to Example 2-4. The results are also shown in Table 9. In the secondary batteries in Comparative Example 2-2 and Comparative Example 0.2-3, the solid $^7$Li-NMR spectrum of the negative electrode material in a full-charged state was measured in the same manner as in Example 2-1 to Example 2-4. The results are shown in Table 9 and Table 10, respectively. FIG. 9 is the solid $^7$Li-NMR spectrum in Comparative Example 2-2 and FIG. 10 is the solid $^7$Li-NMR spectrum in Comparative Example 2-2.

As can be seen from FIG. 3 to FIG. 6, in Example 2-1 to Example 2-4, peaks were within the range of +240 ppm to +280 ppm and the range of −10 ppm to +50 ppm with lithium chloride as the reference. Specifically, the peaks within the range of −10 ppm to +50 ppm were attributed to lithium ions as can be verified by being compared to FIG. 7. On the other hand, the peaks within the range of +2400 ppm to +2800 ppm were attributed to lithium metal as can be verified by being compared to FIG. 8.

Figure 10:
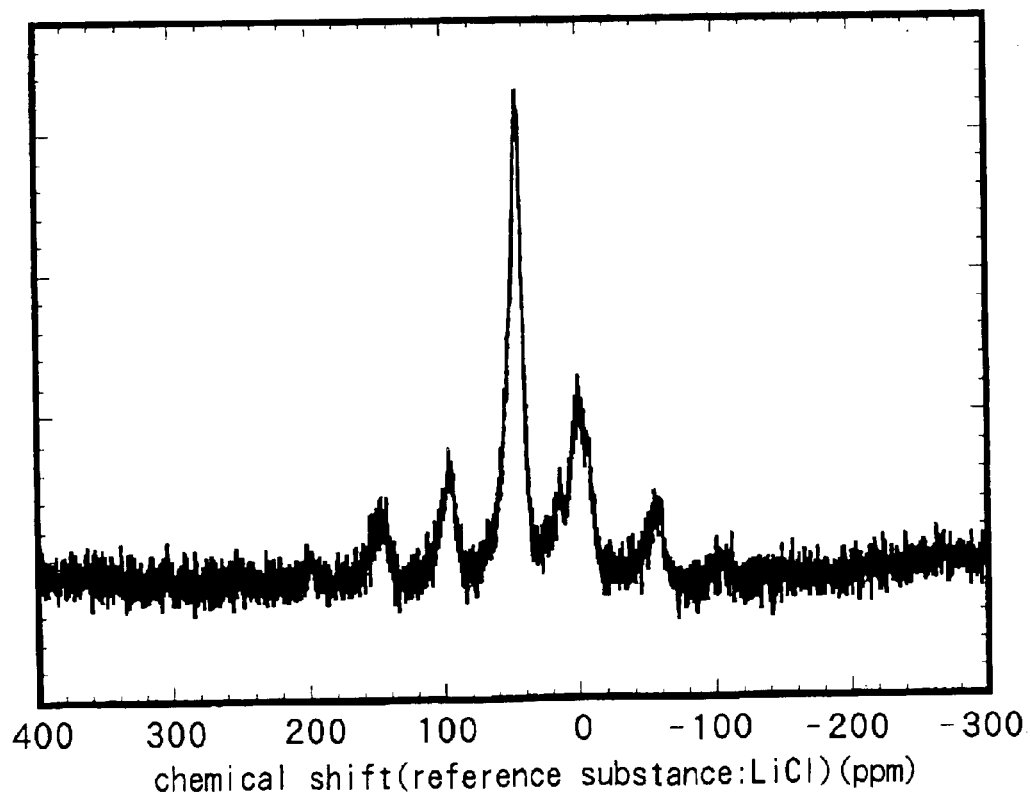
FIG. 10 shows the solid $^7$Li-NMR spectrum of a negative electrode according to Comparative Example 2-3 of the invention.

On the contrary, in Comparative Example 2-2 and Comparative Example 2-3, as can be seen from FIG. 9 and FIG. 10, there were peaks within the range of −10 ppm to +50 ppm attributed to lithium ions. However, there was no peak within the range of +240 ppm to +280 ppm attributed to lithium metal with lithium chloride as the reference.

In short, in Example 2-1 to Example 2-4, in a full-charged state, lithium ions electrochemically stored in graphite and lithium metal having precipitated on the graphite co-existed in the negative electrode 32. On the contrary, in Comparative Example 2-2 and Comparative Example 2-3, there was no lithium metal precipitating in the negative electrode 32.

As can bee seen from FIG. 9, in Example 2-1 to Example 2-4, the discharging capacity and the energy density were almost the same as those of Comparative Example 2-1, and the discharging capacity retention rate was much higher than that of Comparative Example 2-1. Furthermore, the discharging capacity and the energy density were higher than those of Comparative Example 2-1 and Comparative Example 2-3, and the discharging capacity retention rate was almost the same as that of Comparative Example 2-2 and Comparative Example 2-3. In addition, in Example 2-1 to Example 2-4, as the amount of precipitation of lithium metal became larger, the discharging capacity and the energy density became larger but the discharging capacity retention rate was deteriorated.

In short, it is verified that a high charging/discharging capacity can be obtained while improving the cycle characteristic and the boosting charging characteristic if the lithium metal precipitates in the negative electrode material capable of occluding/releasing lithium in a state where the open circuit voltage is lower than the overcharge voltage as well as the capacity of the negative electrode 32 is expressed by the sum of the capacity obtained when occluding/releasing lithium in an ionic state and the capacity which is obtained when precipitating/dissolving lithium metal.

EXAMPLE 2-5 TO EXAMPLE 2-11

As Example 2-5 to Example 2-11, secondary batteries were fabricated in the same manner as in Example 2-1 except that the non-aqueous solvent in the electrolyte was changed as shown in Table 10, and the concentration of $LiPF_6$ in the electrolyte was 1.6 mol/dm$^3$ while the total thickness of the positive electrode 31 and the total thickness of the negative electrode 32 were set to be 165 μm. In the secondary batteries, the discharging capacity and the discharging capacity retention rate were obtained, respectively, in the same manner as in Example 2-1. The results are shown in Table 10, respectively.

When the secondary battery in a full-charged state after the 2nd cycle was decomposed to observe the negative electrode 32, there was no precipitation of lithium metal on the graphite.

As can be seen from Table 10, an excellent discharging capacity and discharging capacity retention rate were obtained in each of Example 2-5 to Example 2-11. The discharging capacity retention rate became higher when the concentration of propylene carbonate was made higher, and the discharging capacity retention rate was the maximum in Example 2-6 where the concentration of propylene carbonate was about 12.5 percent by weight. The characteristic became deteriorated in Example 2-11 where the concentration of propylene carbonate was 30.0 percent by weigh. The reason is that propylene carbonate reacts with the graphite since the graphite is used for the negative electrode 32. The mass fraction of mixing ethylene carbonate with propylene carbonate was 0.53 in Example 2-11.

In other words, precipitating/dissolving of lithium metal can be effectively reacted if the electrolyte contains ethylene carbonate, dimethyl carbonate, ethyl-methyl carbonate, and propylene carbonate. Thereby, an excellent characteristic can be obtained. Also, it is verified that the cycle characteristic can be improved if the concentration of propylene carbonate in the non-aqueous solvent is 30 percent by weight, exclusive, and the mass fraction of mixing ethylene carbonate with propylene carbonate in the non-aqueous solvent is 0.5 and below when using graphite for the negative electrode 32.

EXAMPLE 2-12 TO EXAMPLE 2-16

As Example 2-12 to Example 2-16, secondary batteries were fabricated in the same manner as in Example 2-1 except that the non-aqueous solvent in the electrolyte was changed as shown in Table 11, and the concentration of $LiPF_6$ in the aqueous electrolyte was 1.6 mol/dm$^3$ while the total thickness of the positive electrode 31 and the total thickness of the negative electrode 32 were set to be 165 μm. In Example 2-12 to Example 2-16, 2,4-difluoroanisole (DFA) was contained in the electrolyte. In the secondary batteries, the discharging capacity and the discharging capacity retention rate were obtained, respectively, in the same manner as in Example 2-1. The results are shown in Table 11, respectively.

As can be seen from Table 11, the discharging capacity was the maximum in Example 2-14 where the concentration of 2,4-difluoroanisole was 1.2 percent by weight. The characteristic deteriorated in Example 2-16 where the concentration of 2,4-difluoroanisole was 15.8 percent by weight. In short, it is verified that the discharging capacity can be improved if 2,4-difluoroanisole is contained in the electrolyte. Furthermore, If the concentration of 2,4-difluoroanisole is 15 percent by weight and below, a larger discharging capacity can be obtained.

EXAMPLE 2-17 TO EXAMPLE 2-21

As Example 2-17 to Example 2-21, secondary batteries were fabricated in the same manner as in Example 2-1 except that the non-aqueous solvent in the electrolyte was changed as shown in Table 12, and the concentration of $LiPF_6$ in the electrolyte was 1.6 mol/dm$^3$ while the total thickness of the positive electrode 31 and the total thickness of the negative electrode 32 were set to be 165 $\mu$m. In Example 2-17 to Example 2-21, vinylene carbonate (VC) was contained in the electrolyte. In the secondary batteries, the discharging capacity and the discharging capacity retention rate were obtained, respectively, in the same manner as in Example 2-1. The results are shown in Table 12, respectively.

As can be seen from Table 11, the discharging capacity was the maximum in Example 2-14 where the concentration of 2,4-difluoroanisole was 1.2 percent by weight. The characteristic deteriorated in Example 2-16 where the concentration of 2.4-difluoroanisole was 15.8 percent by weight. In short, it is verified that the discharging capacity can be improved if 2,4-difluoroanisole is contained in the electrolyte. Furthermore, if the concentration of 2,4-difluoroanisole is 15 percent by weight and below, a larger discharging capacity can be obtained.

EXAMPLE 2-22 TO EXAMPLE 2-24

As Example 2-22 to Example 2-24, secondary batteries were fabricated in the same manner as in Example 2-1 except that the non-aqueous solvent in the electrolyte was changed as shown in Table 13, and the concentration of $LiPF_6$ in the electrolyte was 1.6 mol/dm$^3$ while the total thickness of the positive electrode 31 and the total thickness of the negative electrode 32 were set to be 165 $\mu$m. In Example 2-22 to Example 2-23, 2,4-difluoroanisole (DFA) and vinylene carbonate (VC) were contained in the electrolyte. In the secondary batteries, the discharging capacity and the discharging capacity retention rate were obtained, respectively, in the same manner as in Example 2-1. The results are shown in Table 13, respectively.

As can be seen from Table 13, the charging capacity and the discharging capacity retention rate were both improved in Example 2-22 to Example 2-23. In Example 2-24 where each of the concentration of 2,4-difluoroanisole and vinylene carbonate was 15.2 percent by weight, the characteristics were deteriorated. In short, it is verified that the discharging capacity and cycle characteristic can both be improved if 2,4-difluoroanisole and vinylene carbonate are contained in the electrolyte. Furthermore, if the concentration of 2,4-fluoroanisole and vinylene carbonate is 15 percent by weight and below, the characteristic can be further improved.

EXAMPLE 2-25, EXAMPLE 2-26

As Example 2-25 and Example 2-26, secondary batteries were fabricated in the same manner as in Example 2-1 using a carbonaceous material, which was obtained by mixing a non-graphitizing carbonaceous material with the ability of 450 mAh/g charging capacity and an artificial graphite with the ability of 512 mAh/g charging capacity by a mass fraction of 7:3, as the negative electrode material capable of occluding/releasing lithium. At this time, the non-aqueous solvent in the electrolyte was changed as shown in Table 14, and the concentration of $LiPF_6$ in the electrolyte was 1.6 mol/dm$^3$ while the total thickness of the positive electrode 31 and the total thickness of the negative electrode 32 were set to be 165 $\mu$m. In the secondary batteries, the discharging capacity and the discharging capacity retention rate were obtained, respectively, in the same manner as in Example 2-1. The results are shown in Table 14, respectively.

As can be seen from Table 14, results of Example 2-25 and Example 2-26 equivalent to those of Example 2-1 were obtained. In other words, it is verified that the same effects can be obtained by using other carbonaceous material as the negative electrode capable of occluding/releasing lithium. In Example 2-25, a high value was obtained in the discharging capacity retention rate while the discharging capacity was slightly deteriorated compared to that of Example 2-26. In short, it is verified that the cycle characteristic can be improved if ethylene carbonate, dimethyl carbonate, ethylmethyl carbonate, and propylene carbonate are contained in the electrolyte.

The invention has been described by referring to the embodiments and examples. However, the invention is not limited to the embodiments and examples but various modifications are possible. For example, in the above-mentioned embodiment and examples, the case where lithium is used as light metal is described. However, the invention is also applicable to the cases using other alkali metals such as sodium (Na) or potassium (K), alkaline-earth metals such as magnesium (Mg) or calcium (Ca), other light metal such as aluminum (Al), or alloys of these, and the same effects can be obtained. At this time, the negative electrode material capable of occluding/releasing light metal, the positive electrode material, the non-aqueous solvent, and the electrolyte salt are selected depending on the selection of the light metal. However, it is preferable to use lithium or an alloy containing lithium as the light metal so that it has high voltage compatibility with a lithium secondary battery which has been put in a practical use.

In the above-mentioned embodiments and examples, a solid organic electrolyte or a gel electrolyte is described as examples of a solid electrolyte. However, other solid electrolytes may be used. Examples of other solid electrolytes are ceramics with ion-conductivity, solid inorganic electrolyte made of glass with ion-conductivity or ionic crystal, a material obtained by mixing the solid inorganic electrolyte and electrolyte, and a material obtained by mixing the solid inorganic electrolyte and a gel electrolyte or the solid organic electrolyte.

As described, according to the secondary battery of the invention, the negative electrode is formed to include a negative electrode material capable of occluding/releasing light metal in an ionic state while the light metal precipitates in the negative electrode in a state where the open circuit voltage is lower than the overcharge voltage. Therefore, a high energy density can be obtained while improving the cycle characteristic and the boosting charging characteristic.

Especially, according to the secondary battery of one aspect of the invention, light metal precipitates in the negative electrode material capable of occluding/releasing light metal. Therefore, effects of improving the cycle characteristic and the boosting charging characteristic can be obtained.

Further, according to the secondary battery of another aspect of the invention, the maximum amount the light metal precipitating in the negative electrode at the maximum voltage before the open circuit voltage before become overcharge voltage is to be from 0.05 to 3.0 times, both inclusive, the charging capacity of the negative electrode material capable of occluding/releasing light metal. Therefore, a higher energy density can be obtained while effects of further improving the cycle characteristic and the boosting charging characteristic can be obtained.

Moreover, according to the secondary battery of still another aspect of the invention, the ability of charging capacity of the negative electrode material capable of occluding/releasing light metal is 150 mAh/g and more, the thickness of the negative electrode mixture layer is from 10 μm to 300 μm, both inclusive, and the negative electrode material contains 50 percent by weight and more of a negative electrode active material. Therefore, effects of further improving the cycle characteristic and the boosting charging characteristic can be obtained.

In addition, according to the secondary battery of still another aspect of the invention, a carbonaceous material is contained as the negative electrode material capable of occluding/releasing light metal so that changes in the crystal structure, which occur at the time of charging/discharging, can be made smaller. Therefore, effects such that a higher energy density and a stable cycle characteristic are obtained can be achieved.

Furthermore, according to the secondary battery of still another aspect of the invention, an oxide containing light metal is contained in the positive electrode. Therefore, effects of obtaining a higher energy density can be obtained.

In addition, according to the secondary battery of still another aspect of the invention, metallic carbonate is contained in the positive electrode, at least either one of ethylene carbonate or propylene carbonate is contained in the electrolyte, or $LiPF_6$ is contained in the electrolyte. Therefore, effects of further improving the cycle characteristic and the boosting charging characteristic can be obtained.

Furthermore, according to the secondary battery of still another aspect of the invention, the electrolyte contains a non-aqueous solvent which contains propylene carbonate with the concentration of less than 30 percent by weight, and mass fraction of mixing ethylene carbonate with propylene carbonate is set to be 0.5 and more. Therefore, effects of improving the cycle characteristic can be obtained even if, for example, graphite is used as the negative electrode material.

In addition, according to the secondary battery of still another aspect of the invention, at least one kind selected from the group consisting of chain ester carbonate, 2,4-difluoroanisole, and vinylene carbonate is contained in the electrolyte. Therefore, effects of further improving the characteristic can be obtained.

Further, according to another secondary battery of the invention, the capacity of the negative electrode is expressed by the sum of the capacity which is obtained when occluding/releasing light metal in an ionic state and the capacity which is obtained when precipitating/dissolving light metal. Therefore, effects such that a higher energy density is obtained while the cycle characteristic and the boosting charging characteristic are improved can be obtained.

TABLE 1

| | Amount of precipitation of lithium Ability of charging capacity of carbonaceous material | General charging/discharging test | | Boosting charging/discharging test | |
|---|---|---|---|---|---|
| | | Discharging capacity (mAh) | Capacity retention rate (%) | Discharging capacity (mAh) | Capacity retention rate (%) |
| | | 1st cycle | 100th cycle | | 1st cycle | 100th cycle | |

| | | 1st cycle | 100th cycle | rate (%) | 1st cycle | 100th cycle | rate (%) |
|---|---|---|---|---|---|---|---|
| Example 1-1 | 0.5 | 7.81 | 6.87 | 88 | 6.92 | 5.33 | 77 |
| Example 1-2 | — | 7.95 | 4.93 | 62 | 6.62 | 0.93 | 14 |
| Comparative Example 1-1 | — | 7.9 | 4.74 | 60 | 6.68 | 0.80 | 12 |

TABLE 2

| | Amount of precipitation of lithium Ability of charging capacity of carbonaceous material | General charging/discharging test | | Boosting charging/discharging test | |
|---|---|---|---|---|---|
| | | Discharging capacity (mAh) | Capacity retention | Discharging capacity (mAh) | Capacity retention |
| | | 1st cycle | 100th cycle | rate (%) | 1st cycle | 100th cycle | rate (%) |
| Example 1-1 | 0.5 | 7.81 | 6.87 | 88 | 6.92 | 5.33 | 77 |
| Example 1-3 | 0.1 | 6.40 | 5.82 | 91 | 5.58 | 4.52 | 81 |
| Example 1-4 | 0.05 | 6.16 | 5.67 | 92 | 5.40 | 4.43 | 82 |
| Example 1-5 | 1.0 | 9.45 | 7.84 | 83 | 7.87 | 5.51 | 70 |
| Example 1-6 | 2.0 | 11.50 | 8.40 | 73 | 8.28 | 4.72 | 57 |

TABLE 2-continued

|  | Amount of precipitation of lithium Ability of charging capacity of carbonaceous material | General charging/discharging test Discharging capacity (mAh) 1st cycle | | Capacity retention rate (%) | Boosting charging/discharging test Discharging capacity (mAh) 1st cycle | | Capacity retention rate (%) |
|---|---|---|---|---|---|---|---|
|  |  | 1st cycle | 100th cycle |  | 1st cycle | 100th cycle |  |
| Example 1-7 | 3.0 | 13.11 | 7.87 | 60 | 7.95 | 3.26 | 41 |
| Example 1-8 | 4.0 | 15.14 | 6.36 | 42 | 7.57 | 0.98 | 13 |
| Comparative Example 1-1 | — | 7.90 | 4.74 | 60 | 6.68 | 0.80 | 12 |
| Comparative Example 1-2 | 0 | 5.98 | 5.50 | 92 | 5.18 | 4.30 | 83 |

TABLE 3

|  | Ability of discharging capacity of negative electrode | General charging/discharging test Discharging capacity (mAh) 1st cycle | | Capacity retention rate (%) | Boosting charging/discharging test Discharging capacity (mAh) 1st cycle | | Capacity retention rate (%) |
|---|---|---|---|---|---|---|---|
|  |  | 1st cycle | 100th cycle |  | 1st cycle | 100th cycle |  |
| Example 1-3 | 400 | 6.40 | 5.28 | 91 | 5.58 | 4.52 | 81 |
| Example 1-9 | 512 | 6.45 | 5.93 | 92 | 5.68 | 4.71 | 83 |
| Example 1-10 | 306 | 6.41 | 5.70 | 89 | 5.52 | 4.36 | 79 |
| Example 1-11 | 202 | 6.36 | 5.53 | 87 | 5.47 | 3.99 | 73 |
| Example 1-12 | 148 | 6.30 | 5.17 | 82 | 5.43 | 3.42 | 63 |
| Example 1-13 | 96 | 6.26 | 4.51 | 72 | 5.39 | 1.99 | 37 |
| Example 1-14 | 58 | 6.21 | 3.85 | 62 | 5.33 | 0.96 | 18 |
| Comparative Example 1-1 | — | 7.90 | 4.74 | 60 | 6.68 | 0.80 | 12 |
| Comparative Example 1-2 | 400 | 5.98 | 5.50 | 92 | 5.18 | 4.30 | 83 |

TABLE 4

|  | Thickness of negative electrode mixture layer (μm) | General charging/ discharging test Capacity retention rate (%) | Boosting charging/ discharging test Capacity retention rate (%) |
|---|---|---|---|
| Example 1-3 | 80 | 91 | 81 |
| Example 1-15 | 100 | 92 | 81 |
| Example 1-16 | 200 | 90 | 76 |
| Example 1-17 | 300 | 88 | 68 |
| Example 1-18 | 400 | 79 | 38 |
| Example 1-19 | 50 | 91 | 82 |
| Example 1-20 | 20 | 91 | 81 |
| Example 1-21 | 10 | 91 | 81 |

TABLE 5

|  | General charging/ discharging test Capacity retention rate (%) | Boosting charging/ discharging Test Capacity retention rate (%) |
|---|---|---|
| Example 1-3 | 88 | 77 |
| Example 1-22 | 89 | 81 |

TABLE 6

|  | Non-aqueous solvent | Electrolyte salt | General charging/ discharging test Capacity retention rate (%) | Boosting charging/ discharging test Capacity retention rate (%) |
|---|---|---|---|---|
| Example 1-1 | PC:DMC (50:50) | LiPF$_6$ | 88 | 77 |
| Example 1-23 | EC:DMC (50:50) | LiPF$_6$ | 89 | 81 |
| Example 1-24 | PC:EC:DMC (25:25:50) | LiPF$_6$ | 89 | 82 |
| Example 1-25 | PC | LiPF$_6$ | 85 | 68 |
| Example 1-26 | PC:EC (50:50) | LiPF$_6$ | 87 | 73 |
| Example 1-27 | PC:DMC (50:50) | LiPF$_4$ | 80 | 55 |

TABLE 7

|  | General charging/ discharging test Capacity retention rate (%) | Boosting charging/ discharging Test Capacity retention rate (%) |
|---|---|---|
| Example 1-1 | 88 | 77 |
| Example 1-28 | 85 | 75 |
| Comparative Example 1-1 | 60 | 12 |

TABLE 8

| | General charging/ discharging test Capacity retention rate (%) | Boosting charging/ discharging Test Capacity retention rate (%) |
|---|---|---|
| Example 1-1 | 88 | 77 |
| Example 1-26 | 87 | 73 |
| Example 1-29 | 88 | 76 |
| Comparative Example 1-1 | 60 | 12 |

TABLE 9

| | Total thickness of positive electrode ($\mu$m) | Material for negative electrode | Total thickness of negative electrode ($\mu$m) | Discharging capacity (mAh) | Energy density (wh/dm$^3$) | Discharging capacity retention rate (%) |
|---|---|---|---|---|---|---|
| Example 2-1 | 150 | Graphite | 160 | 856.6 | 325.5 | 87 |
| Example 2-2 | 150 | Graphite | 140 | 897.9 | 341.2 | 83 |
| Example 2-3 | 150 | Graphite | 120 | 945.7 | 356.4 | 84 |
| Example 2-4 | 150 | Graphite | 110 | 996.7 | 378.7 | 82 |
| Comparative Example 2-1 | 150 | Li metal | 140 | 900.5 | 342.2 | 5.2 |
| Comparative Example 2-2 | 150 | Graphite | 170 | 818.3 | 311.0 | 88 |
| Comparative Example 2-3 | 150 | Graphite | 190 | 736.5 | 279.9 | 85 |

TABLE 10

| | Non-aqueous solvent (volume %) | | | | Discharging capacity (mAh) | Discharging capacity retention rate (%) |
|---|---|---|---|---|---|---|
| | EC | DMC | EMC | PC | | |
| Example 2-5 | 17.8 | 55.6 | 4.4 | 22.2 | 845 | 90.9 |
| Example 2-6 | 20.0 | 62.5 | 5.0 | 12.5 | 858 | 92.0 |
| Example 2-7 | 21.3 | 66.7 | 5.3 | 6.7 | 868 | 91.3 |
| Example 2-8 | 22.5 | 70.4 | 5.6 | 1.4 | 873 | 90.2 |
| Example 2-9 | 22.7 | 70.9 | 5.7 | 0.7 | 876 | 88.0 |
| Example 2-10 | 22.9 | 71.4 | 5.7 | 0.0 | 862 | 80.3 |
| Example 2-11 | 16.0 | 50.0 | 4.0 | 30.0 | 810 | 77.6 |

TABLE 11

| | Non-aqueous solvent (volume %) | | | | | Discharging capacity (mAh) | Discharging capacity retention rate (%) |
|---|---|---|---|---|---|---|---|
| | EC | DMC | EMC | PC | DFA | | |
| Example 2-12 | 18.4 | 57.5 | 4.6 | 11.5 | 8.0 | 861 | 90.8 |
| Example 2-13 | 19.2 | 59.9 | 4.8 | 12.0 | 4.2 | 866 | 91.2 |
| Example 2-14 | 19.8 | 61.7 | 4.9 | 12.3 | 1.2 | 879 | 91.9 |
| Example 2-15 | 20.0 | 62.4 | 5.0 | 12.5 | 0.1 | 861 | 91.5 |
| Example 2-16 | 16.8 | 52.6 | 4.2 | 10.5 | 15.8 | 804 | 74.8 |

TABLE 12

| | Non-aqueous solvent (volume %) | | | | | Discharging capacity (mAh) | Discharging capacity retention rate (%) |
|---|---|---|---|---|---|---|---|
| | EC | DMC | EMC | PC | VC | | |
| Example 2-17 | 18.4 | 57.5 | 4.6 | 11.5 | 8.0 | 830 | 92.2 |
| Example 2-18 | 19.3 | 60.2 | 4.8 | 12.0 | 3.6 | 835 | 92.4 |
| Example 2-19 | 19.8 | 61.7 | 4.9 | 12.3 | 1.2 | 854 | 94.3 |
| Example 2-20 | 20.0 | 62.4 | 5.0 | 12.5 | 0.1 | 854 | 90.6 |
| Example 2-21 | 16.8 | 52.6 | 4.2 | 10.5 | 15.8 | 793 | 76.3 |

TABLE 13

| | Non-aqueous solvent (volume %) | | | | | | Discharging capacity (mAh) | Discharging capacity retention rate (%) |
|---|---|---|---|---|---|---|---|---|
| | EC | DMC | EMC | PC | DFA | VC | | |
| Example 2-22 | 19.5 | 61.0 | 4.9 | 12.2 | 1.2 | 1.2 | 866 | 93.1 |
| Example 2-23 | 19.7 | 61.7 | 4.9 | 12.3 | 0.1 | 1.2 | 858 | 92.3 |
| Example 2-24 | 13.9 | 43.5 | 3.5 | 8.7 | 15.2 | 15.2 | 764 | 75.4 |

TABLE 14

| | Nonaqueous solvent (volume %) | | | | Discharging capacity | Discharging capacity retention |
|---|---|---|---|---|---|---|
| | EC | DMC | EMC | PC | (mAh) | rate (%) |
| Example 2-25 | 18.0 | 37.0 | 5.0 | 40.0 | 767 | 92.7 |
| Example 2-26 | 30.0 | 61.0 | 8.3 | 0 | 771 | 90.1 |

What is claimed is:

1. A secondary battery comprising:

a negative electrodes;

a positive electrode; and an electrolyte, wherein:

the negative electrode includes a negative electrode material capable of occluding and releasing light metal in an ionic state while the light metal precipitates on the negative electrode in a state where an open circuit voltage is lower than an overcharge voltage; and wherein when the open circuit voltage of the battery is below overcharging voltages, the ratio (moles of light metal precipitated on the negative electrode)/(moles of light metal reversibly occluded in the material of the negative electrode) is at least 0.05/1 and at most 3/1.

2. A secondary battery as claimed in claim 1, wherein the light metal comprises lithium.

3. A secondary battery as claimed in claim 2, wherein lithium precipitates on the negative electrode when the open circuit voltage of the battery is at least 0 V and at most 4.2 V.

4. A secondary battery as claimed in claim 2, wherein a peak attributed to lithium ion and a peak attributed to lithium metal are obtained when measuring the negative electrode material in a full-charged state by a $^7$Li polynuclear species nuclear magnetic resonance spectroscopy.

5. A secondary battery as claimed in claim 4, wherein the peak attributed to lithium ion measured in the full-charged state disappears when measuring the negative electrode material in a complete-discharged state by the $^7$Li polynuclear species nuclear magnetic resonance spectroscopy.

6. A secondary battery as claimed in claim 1, wherein the light metal precipitates on the negative electrode material.

7. A secondary battery as claimed in claim 1, wherein the ability of charging capacity of the negative electrode material is 150 mAh/g and more.

8. A secondary battery as claimed in claim 2, wherein the negative electrode has a negative electrode mixture layer containing the negative electrode material and the thickness of the negative electrode mixture layer is from at least 10 µm to at most 300 µm.

9. A secondary battery as claimed in claim 1, wherein the negative electrode material contains 50 percent by weight and more of a negative electrode active material.

10. A secondary battery as claimed in claim 1, wherein the negative electrode contains a carbonaceous material as the negative electrode material.

11. A secondary battery as claimed in claim 1, wherein the positive electrode contains an oxide containing the light metal.

12. A secondary battery as claimed in claim 1, wherein the positive electrode contains metallic carbonate.

13. A secondary battery as claimed in claim 12, wherein the metallic carbonate is lithium carbonate.

14. A secondary battery as claimed in claim 1, wherein the electrolyte contains at least one of the group consisting of ethylene carbonate and propylene carbonate.

15. A secondary battery as claimed in claim 14, wherein the electrolyte contains a non-aqueous solvent which contains propylene carbonate with a concentration of less than 30 percent by weight.

16. A secondary battery as claimed in claim 14, wherein the electrolyte contains ethylene carbonate and propylene carbonate and a mass fraction of mixing ethylene carbonate to propylene carbonate (ethylene carbonate/propylene carbonate) is 0.5 and more.

17. A secondary battery as claimed in claim 1, wherein the electrolyte contains at least one of the group consisting of chain ester carbonate, 2,4-difluoroanisole, and vinylene carbonate.

18. A secondary battery as claimed in claim 17, wherein the electrolyte contains a non-aqueous solvent which contains 2,4-difluoroanisole at a concentration of 15 percent by weight and below.

19. A secondary battery as claimed in claim 17, wherein the electrolyte contains a non-aqueous solvent which contains vinylene carbonate with a concentration of 15 percent by weight and below.

20. A secondary battery as claimed in claim 1, wherein the electrolyte contains ethylene carbonate, propylene carbonate, dimethyl carbonate, and ethyl-methyl carbonate.

21. A secondary battery as claimed in claim 1, wherein the electrolyte contains $LiPF_6$.

22. A secondary battery as claimed in claim 1, wherein the electrolyte is in a solid state.

* * * * *